Oct. 31, 1961
J. J. DEUTSCH
3,006,538
COMBINATION OF A CASH REGISTER, ACCOUNTING
OR LIKE MACHINE, AND A TICKET OR
STAMP ISSUING MECHANISM

Filed Dec. 14, 1956

INVENTOR
JOHANN J. DEUTSCH

BY Karl Benst
Henry Silbereis
HIS ATTORNEYS

Oct. 31, 1961  J. J. DEUTSCH  3,006,538
COMBINATION OF A CASH REGISTER, ACCOUNTING
OR LIKE MACHINE, AND A TICKET OR
STAMP ISSUING MECHANISM
Filed Dec. 14, 1956  10 Sheets-Sheet 3
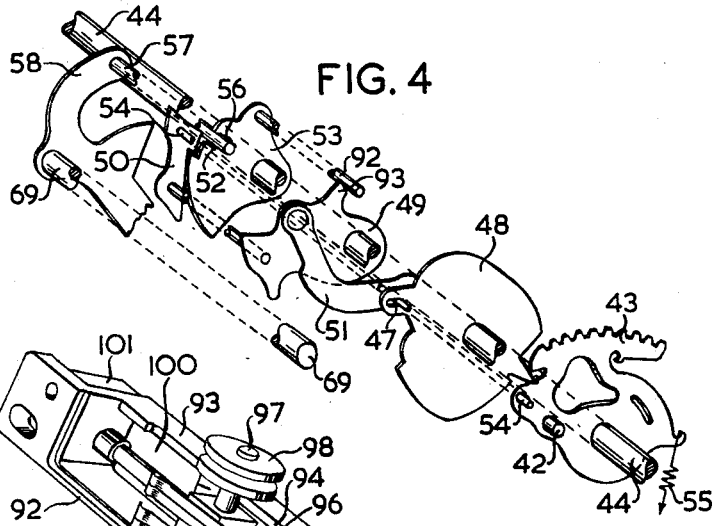
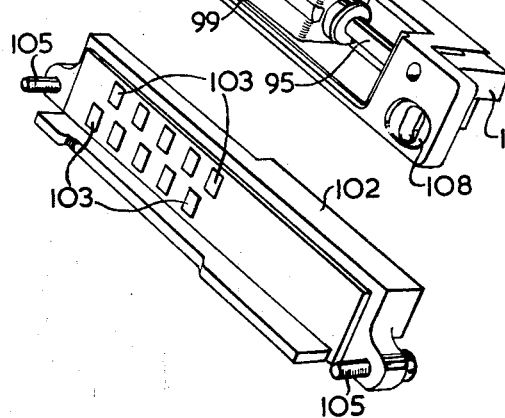
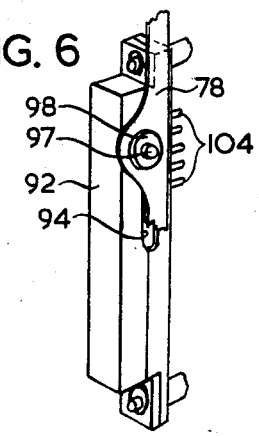
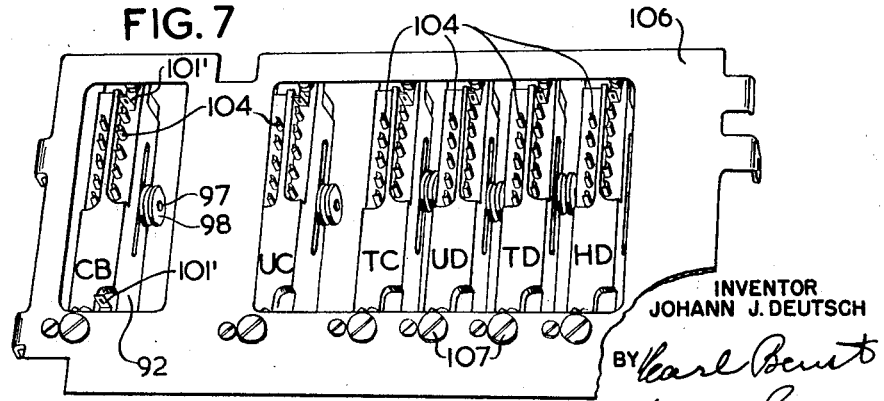
INVENTOR
JOHANN J. DEUTSCH
BY Carl Berit
Henry Siebers
HIS ATTORNEYS Oct. 31, 1961     J. J. DEUTSCH     3,006,538
COMBINATION OF A CASH REGISTER, ACCOUNTING
OR LIKE MACHINE, AND A TICKET OR
STAMP ISSUING MECHANISM
Filed Dec. 14, 1956     10 Sheets-Sheet 4
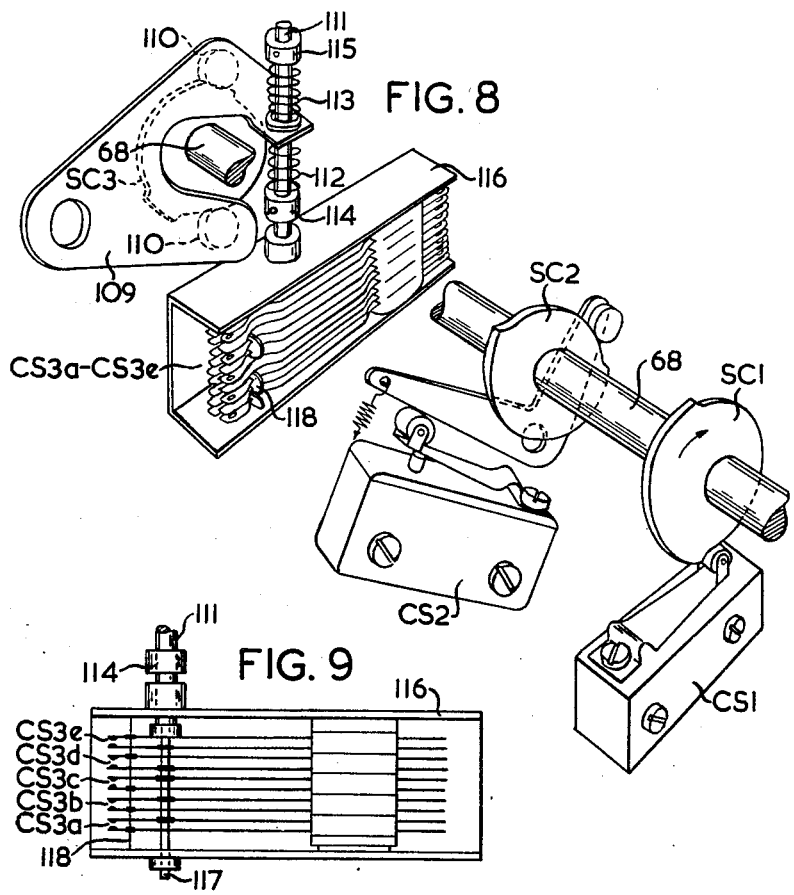
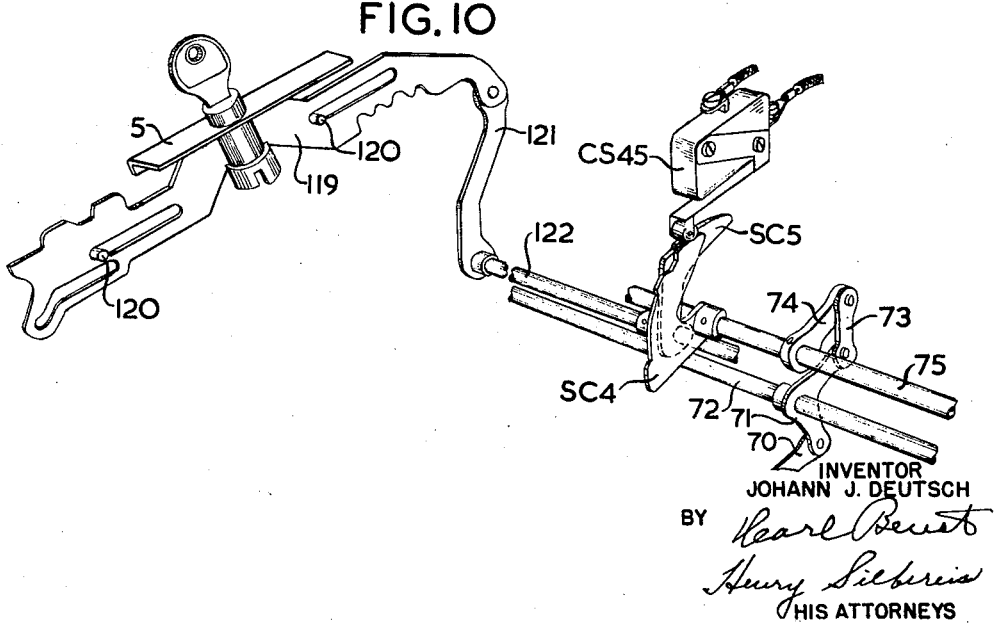
INVENTOR
JOHANN J. DEUTSCH
HIS ATTORNEYS Oct. 31, 1961 J. J. DEUTSCH 3,006,538
COMBINATION OF A CASH REGISTER, ACCOUNTING
OR LIKE MACHINE, AND A TICKET OR
STAMP ISSUING MECHANISM
Filed Dec. 14, 1956 10 Sheets—Sheet 5
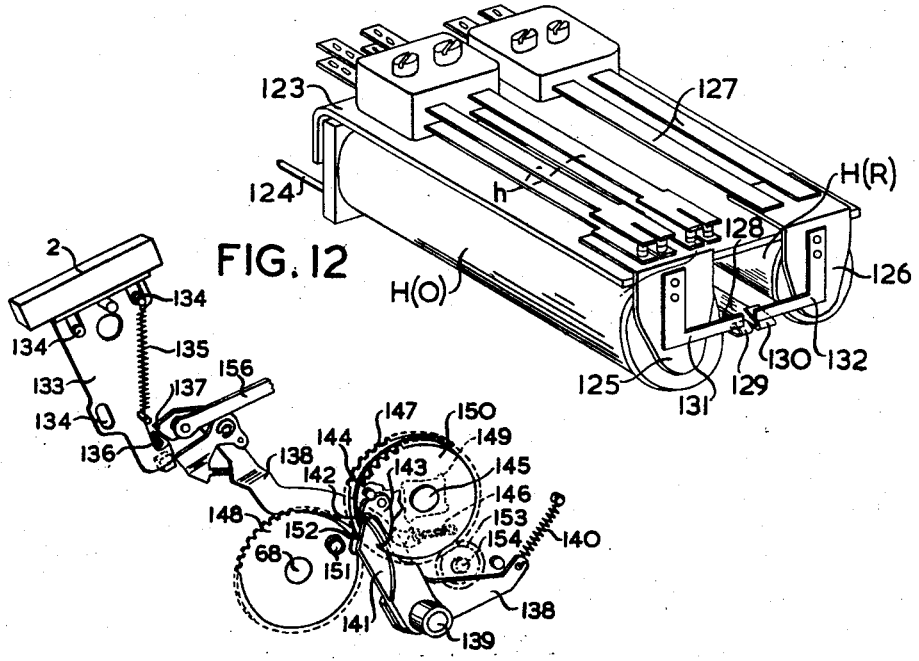
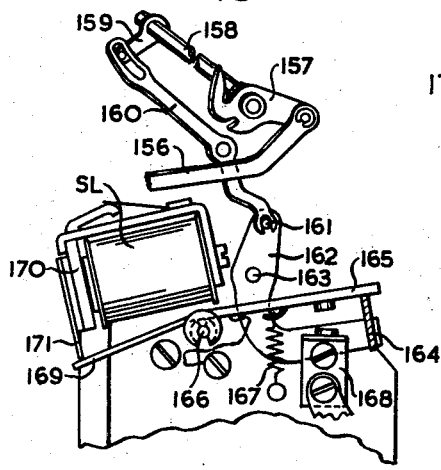
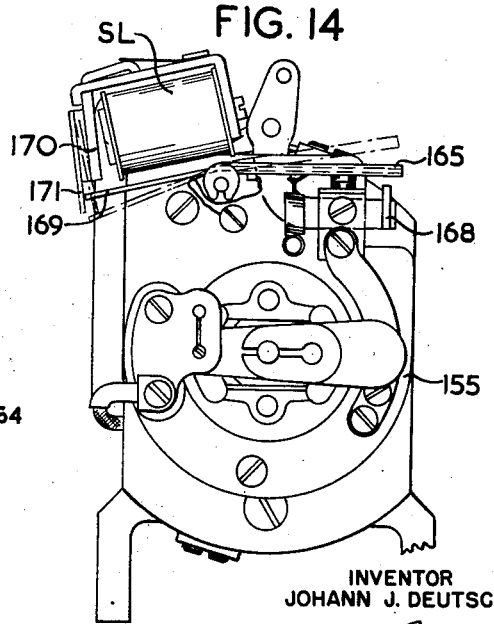
INVENTOR
JOHANN J. DEUTSCH
HIS ATTORNEYS

INVENTOR
JOHANN J. DEUTSCH

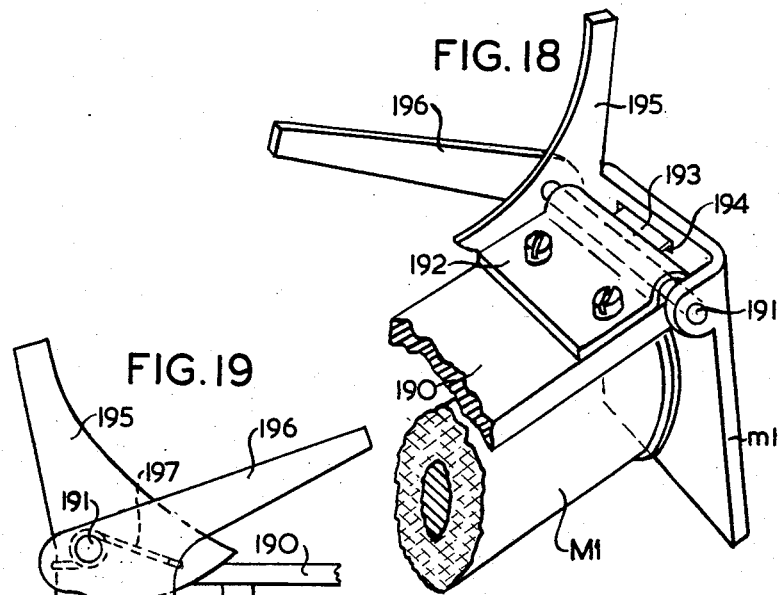
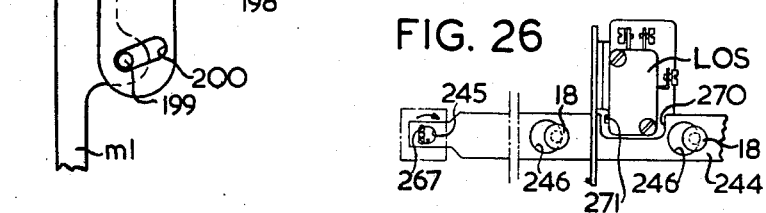
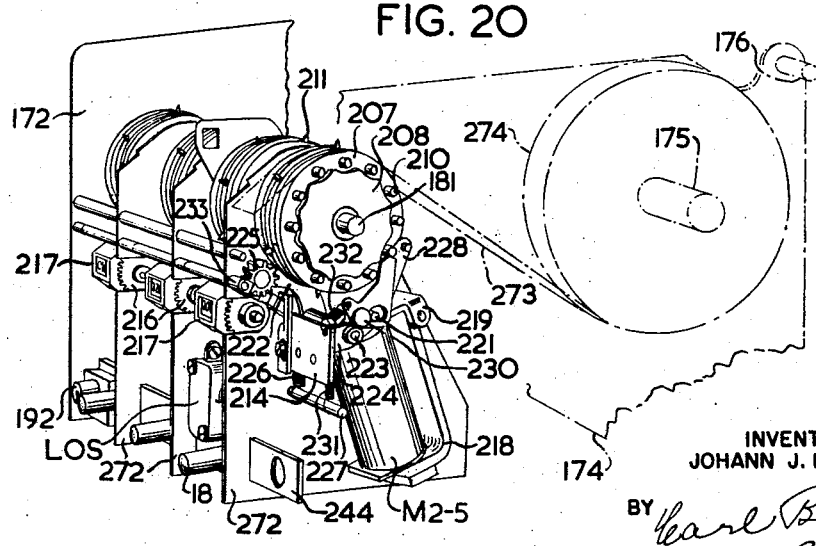

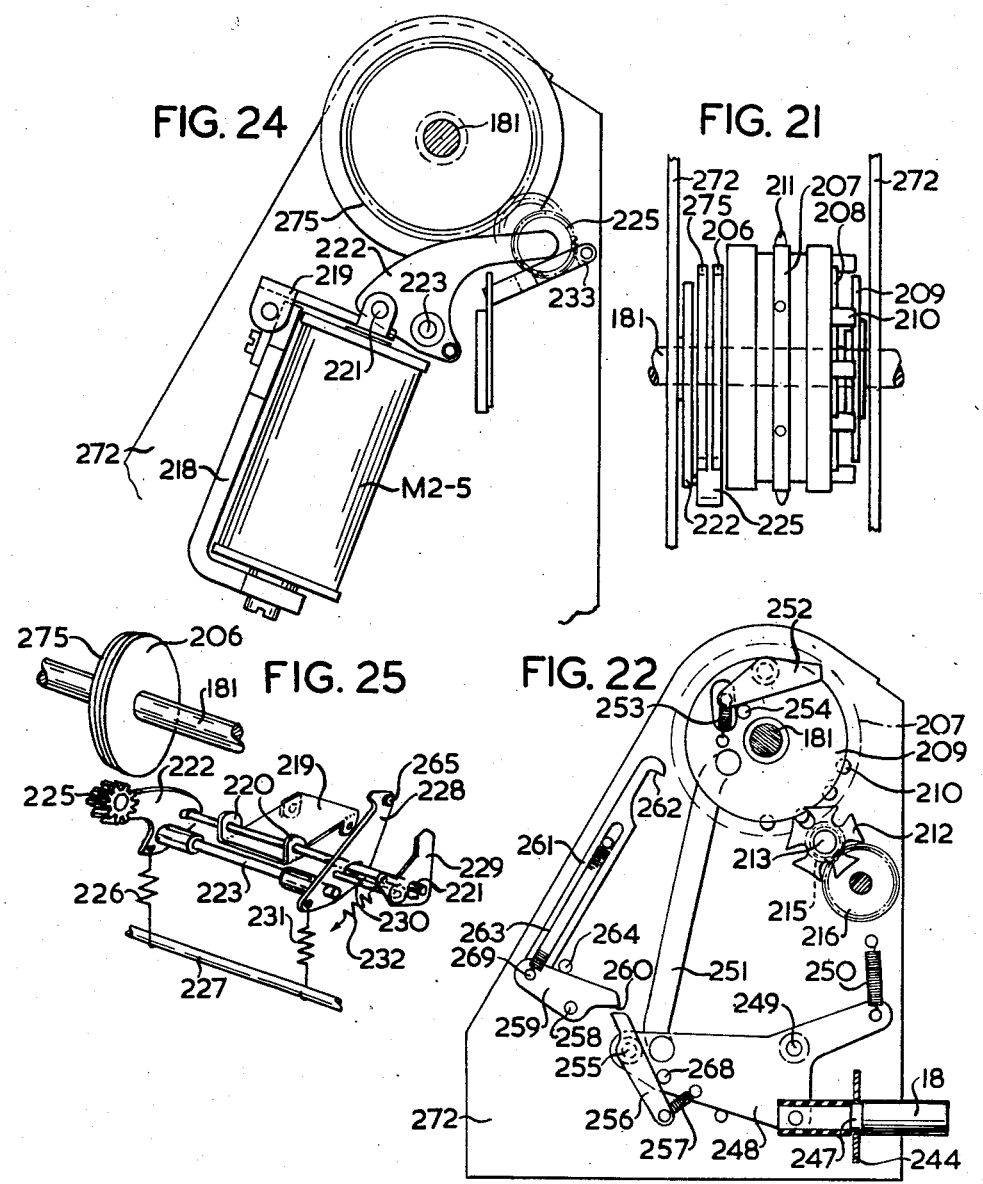

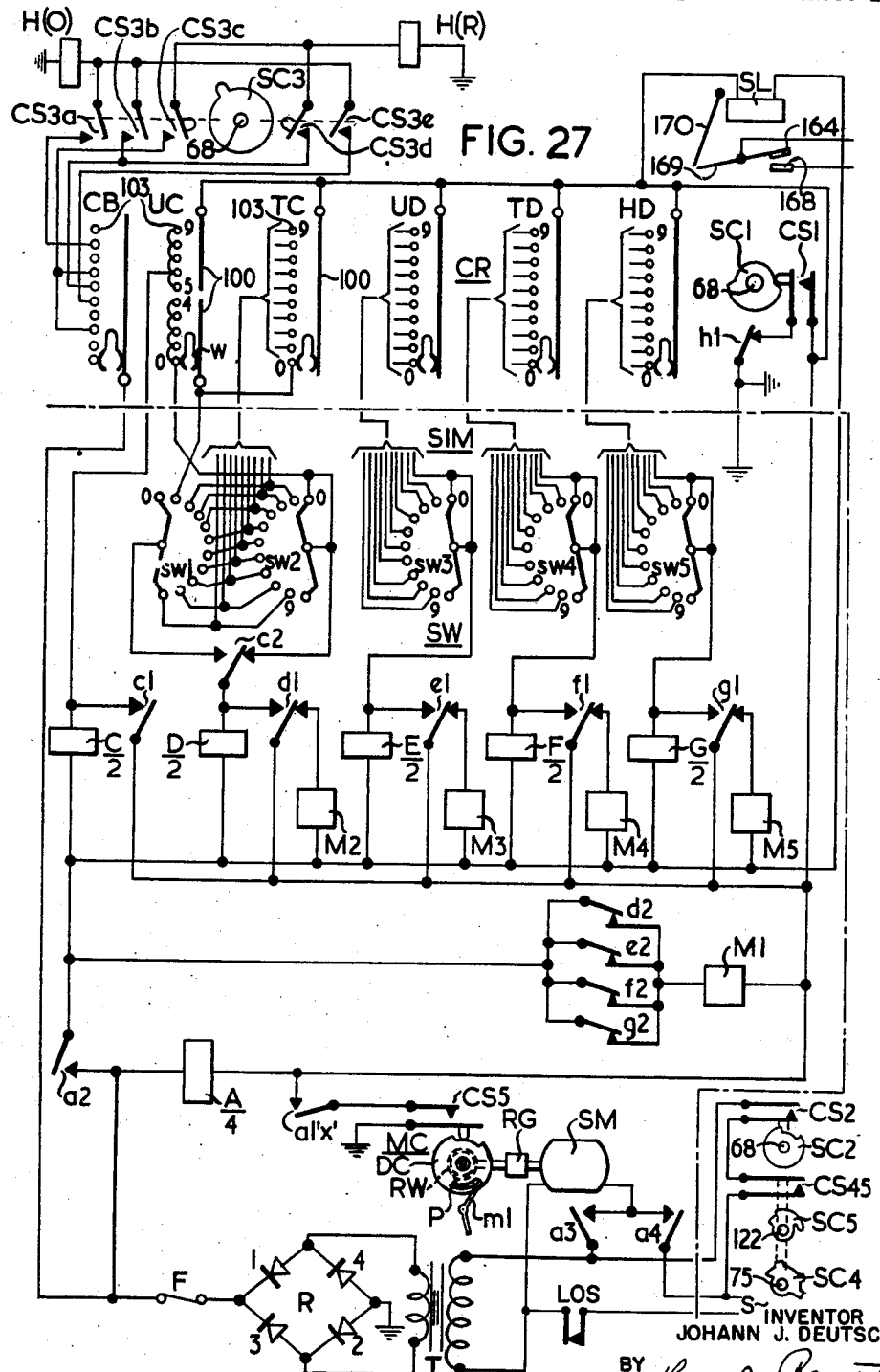

United States Patent Office 3,006,538
Patented Oct. 31, 1961

3,006,538
COMBINATION OF A CASH REGISTER, ACCOUNTING OR LIKE MACHINE, AND A TICKET OR STAMP ISSUING MECHANISM
Johann J. Deutsch, Zurich, Switzerland, assignor to The National Cash Register Company, Dayton, Ohio, a corporation of Maryland
Filed Dec. 14, 1956, Ser. No. 628,461
Claims priority, application Great Britain Aug. 29, 1956
13 Claims. (Cl. 235—2)

This is a continuation-in-part of application Serial No. 606,369, filed August 27, 1956 (now abandoned), and relates to a combination of a cash register, accounting or like machine, and a ticket or stamp issuing device adapted to be remotely controlled from, and may be remotely situated to, the said machine so as to issue series of denominational tickets or stamps representing values equivalent to the amounts entered into the machine.

In explanation of one of the instances in which the mechanism of the present invention may be employed, reference may be made to the system in operation in certain merchandising establishments wherein, in regard to the purchase of certain goods, a customer is given a rebate or credit which is represented in the form of denominational stamps or some other token relative to the amount of the purchase.

Therefore, one particular instance for use of the combination of the invention is in such establishments, wherein, in respect of entries made into the cash register and relating to purchases in respect of which bonus or credit is given, the ticket or stamp issuing mechanism automatically issues tickets or stamps of various denominational values, totalling in token value the amount expended on such purchases.

It has previously been proposed to provide a mechanically controlled stamp issuing mechanism in association with a cash register for the purpose above described, but in this case, through the mechanical interconnections, the mechanism necessarily has directly to be coupled to the cash register in effect to become an integral part thereof and individually associated therewith.

Therefore, it is the object of the present invention to provide a combination in which the ticket or stamp issuing mechanism is separate from, and may be remotely situated to, the cash register or like machine, and which is electrically controlled from the register so as automatically to issue stamps of various denominations which, in total value, are related to the amount of the transaction entered into the machine.

Therefore, the broadest feature of the invention consists in the combination of a cash register, accounting or like machine and a ticket or stamp issuing device remotely controlled from and located to the said machine so as automatically to issue tickets or stamps representing in value the amounts involved in transactions entered into said machine.

This and other features of the invention are exemplified by a specific embodiment thereof which will now be described in conjunction with the accompanying drawings in which:

FIG. 4 is an exploded view of a latch mechanism included in the cash register.

FIG. 5 is a perspective view of a multipoint switch as included in the cash register.

FIG. 6 is a view showing the manner in which the switch illustrated in FIG. 5 is associated with an indicator setting link of the cash register.

FIG. 7 illustrates a unitary assembly of switches as illustrated in FIG. 5 for fitting into the cash register.

FIG. 8 shows in perspective the arrangement of several cam operated electrical switches and contacts included in the cash register.

FIG. 9 is a more detailed and side view of the contact spring pile assembly as shown in FIG. 8.

FIG. 10 is a perspective view illustrating the dual control of an electric switch from control keys and a control slide of the cash register.

FIG. 11 illustrates in perspective an electrical relay which is electromagnetically operated, mechanically locked and electromagnetically released.

FIGS. 12 and 13 illustrate the motor or release bar of the cash register and the linkages extending therefrom for controlling the motor switch for closing the circuit of the driving motor of the cash register, and the clutch for coupling the driving motor to the main driving shaft of the machine.

FIG. 14 particularly illustrates one manner in which the motor switch for the driving motor of the cash register can be locked against operation.

Figure 15:
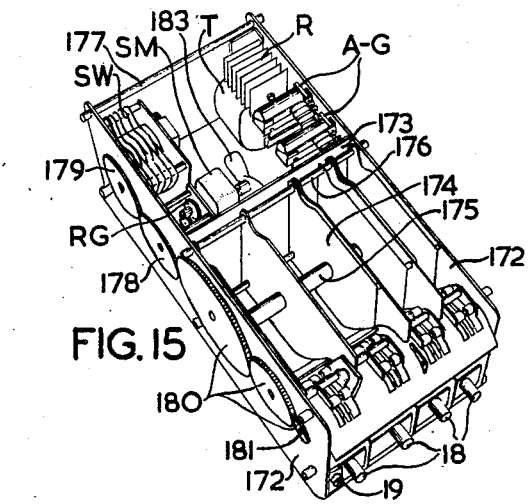

FIG. 15 is a general perspective view looking downwardly on the ticket or stamp issuing device and showing the general disposition of the components therein.

Figure 16:
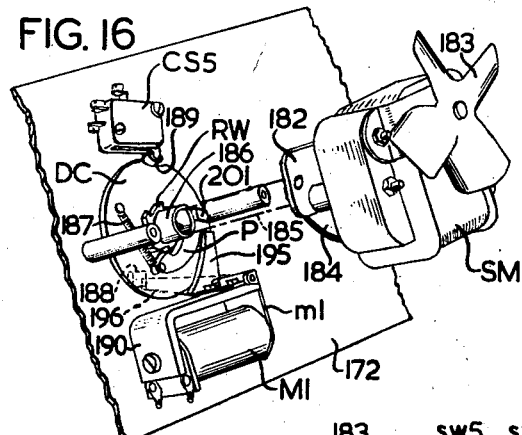

FIG. 16 is a fragmentary exploded view showing the driving motor and main clutch mechanism of the ticket or stamp issuing device.

Figure 17:
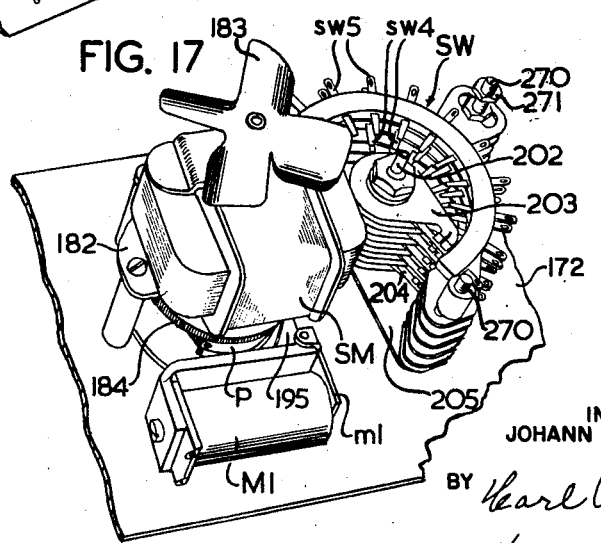

FIG. 17 is an assembled view of the components, as illustrated in FIG. 16, and also shows a multibank multipoint electrical switch.

FIGS. 18 and 19 are perspective and side views of electromagnetically controlled arrangements for controlling the engagement of the main clutch mechanism of the ticket or stamp issuing device.

FIG. 20 is a perspective view of the ticket or stamp issuing mechanisms located at the front portion of the ticket or stamp issuing device.

FIG. 21 is a plan view of feeding sprocket and associated driving means for feeding stamps or tickets from the issuing device therefor.

FIG. 22 is a view particularly illustrating part of the mechanism for effecting the issue of tickets or stamps under manual control.

Figure 23:
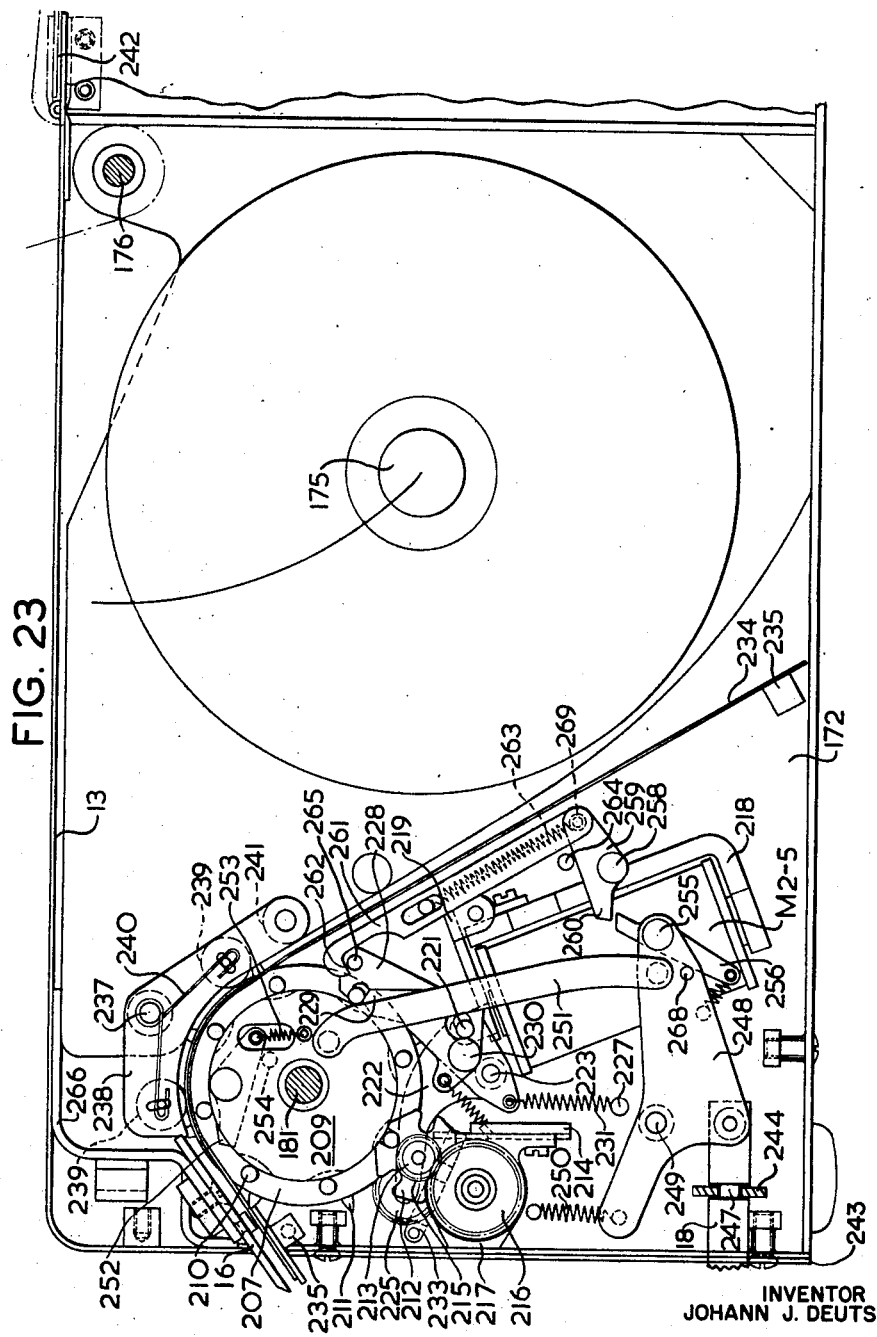

FIG. 23 is a sectional view taken through the ticket or stamp issuing device and particularly illustrates the components for effecting the issue of tickets or stamps under manual control.

FIG. 24 is a fragmentary view showing the method of coupling the driving means to the ticket or stamp issuing mechanisms.

FIG. 25 is an exploded view showing the means for effecting the engagement of the ticket or stamp issuing sprockets with their driving means, and stop and backstop pawls for the sprockets.

FIG. 26 illustrates a method for mechanically locking press buttons which are provided for effecting the issue of tickets or stamps under manual control.

FIG. 27 is a schematic circuit drawing of the controlling circuit arrangements.

Figure 1:
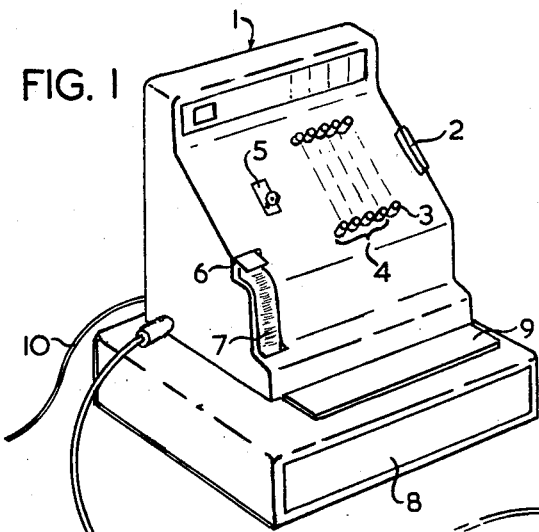
FIG. 1 illustrates schematically the association of a cash register with a ticket or stamp issuing device.

In FIG. 1 is diagrammatically illustrated an embodiment of the invention in which 1 represents a cash register of a kind similar to that described and illustrated in British patent specification No. 614,347 and United States Patent No. 2,450,165, issued to Harold O. Randall and John B. Geers on September 28, 1948, and which include an itemizing totalizer for totalling the items of multiple item sales, and a grand totalizer to which such items are transferred when the itemizing totalizer is totalled at the end of the sale. To the right of the cash register keyboard is the motor or release bar 2 of the machine, and the keyboard consists of a row 3 of control keys together with several denominational rows 4 for entering the amounts of transactions. A control slide 5 is situated to the left of the keyboard and is movable to any one of five control positions by means of a removable key. With the slide in the topmost position, the machine is conditioned to act as an itemizing cash register. In the next lower position the machine is locked against operation. In the next lower position, the machine is conditioned for automatically reading the grand totalizer, on the depression of the motor bar 2, whereas in the next lower position the machine is conditioned to act as an adding machine using the itemizing totalizer so that any total standing in the grand totalizer is not disturbed. In the lowermost position the machine is conditioned for resetting or totalling the grand totalizer. The manner in which these functions are carried out is fully described in the aforementioned specification. Also on the left-hand side of the machine is a receipt issuing orifice 6 from which sales receipts are issued. The particulars regarding transactions entered into the register are also printed on an audit strip within the machine, the last entries on which are visible through a window 7 which has an opening through which autographic entries may be made on the audit strip. A cash drawer 8 is mounted in a base which supports the cash register, and on the projecting front of the cash drawer base is a change plate 9. Electrical power over a cable 10 is supplied to the machine for the operation thereof by an electric motor, in addition to which the machine is provided with a handle which is detachably fitted on a shaft at the right-hand side of the machine for the manual operation thereof should a power failure occur or for any other reason.

The ticket or stamp issuing device is designated generally by reference 11 and is interconnected with the cash register over a multiconductor cable 12. The device encloses a plurality of rolls of tickets or stamps, one in respect of, and related to, each denomination of the amount keyboard 4 of the cash register. The rolls of stamps are carried on individually pivoted frames which, on the lifting of a top 13 of the device after the unlocking of a key lock 14, may be pivoted out of the device to facilitate charging or replenishment. The leading ends of the rolls, such as 15, are adapted to be fed out through individual apertures in a guiding and tear off plate 16 fitted to the front of the device. Located below each of the issuing apertures is a window 17 through which are visible the number wheels of a cyclometer type counter, the purpose of which is to count the number of the respective tickets or stamps issued. Under normal conditions of operation, tickets or stamps are adapted automatically to be issued as indicated at 15 in respect of the amounts involved in transactions, under electrical control. However, arrangements are provided whereby issue under manual control may be effected. A press button 18 is provided associated with each denomination, the buttons normally being locked against depression by a slide which, in itself, is locked by a keylock 19. When the latter is unlocked by inserting and turning a key, the slide is moved to release the buttons so that a ticket or stamp is issued at each depression of the related button.

Figure 2:
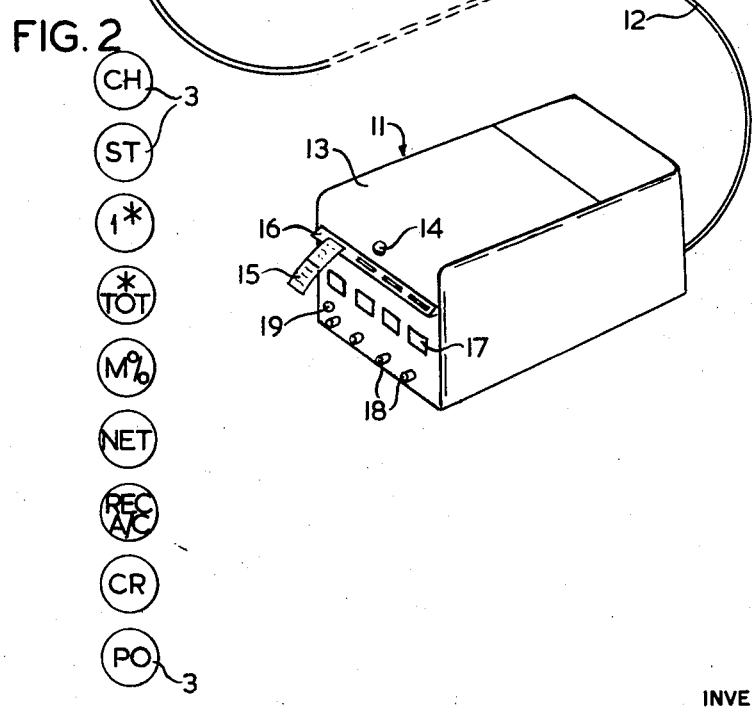
FIG. 2 shows the disposition of keys in a row of control keys of the cash register.

In regard to transactions entered into the cash register, these are divided into several types, and these types together with other incidental operations will generally be described in association with the functions of the row 3 of control keys of the cash register as shown in FIG. 2.

The upper most key in the control row 3 is a change key "CH" which, on depression, followed by depression of the motor bar 2, solely effects opening of the cash drawer for the purpose of giving change, and a receipt is issued and a record made on the audit strip, but the machine remains otherwise inactive. In a multiple item transaction some of the items, that is bonus items, may carry a bonus rebate in respect of which tickets or stamps are to be issued from the device 11, and some items, that is net items, may not be subject to such rebate. The amounts of the bonus items are entered firstly into the amount keyboard, and thus added into the itemizing totalizer, after which the sub-total key "ST" of row 3 is depressed, followed by the motor bar 2 to release the machine. In consequence of this, the machine is caused to sub-total the itemizing totalizer, and tickets or stamps equivalent to the value of the bonus items are issued from the device. The net items are now entered into the machine, the "NET" key of control row 3 being depressed at the entry of each item which suppresses the issue of tickets or stamps in respect of these items. After the entry of all of the item the total key "TOT*" is depressed followed by the motor bar 2 whereupon the itemizing totalizer is reset to zero, the amount standing therein is transferred to the grand totalizer, and an itemized receipt is issued from the orifice 6. In consequence of the depression of the sub-total key "ST," and consequent issue of tickets from the device 11, the latter is rendered inoperative following the completion of the reset operation.

In the event of a transaction consisting entirely of bonus items, then the total key "TOT*" is depressed instead of the sub-total key which will also initiate the issue of stamps from the device 11.

The key marked 1 with an asterisk is for a single item bonus sale and is operated after the relevant amount keys, and followed by the depression of the motor bar 2 whereupon a receipt is issued together with the issue of tickets or stamps equivalent to the value of the sale from the device 11.

The key marked "M%" is for effecting a double issue of stamps where certain items carry a plus percentage bonus, that is, these items are entered as before and sub-totalled which is followed by the depression of the "M%" key and the motor bar 2 whereupon the previous issue of tickets or stamps is duplicated. This is followed by the totalling operation as before described.

The "NET" key is operated prior to the motor bar in all transactions involving entirely net items, and suppresses stamp issue from the device 11.

The key marked "REC A/C" is a received on account key which is operated subsequent to the entry of the amount on the amount keyboard and which is followed by the depression of the motor bar 2 so that, whereas the issue of a receipt takes place, no stamps are issued by the device 11.

The credit key "CR" is for sales on credit which are not entered into the totalizer but a receipt is issued in respect thereof and the details printed on the audit strip against which an autographic entry may be made. The device 11 is operated to issue tickets or stamps equivalent to the value of the amount entered on the audit strip and the receipt.

The Paid Out key "PO" on depression followed by the motor bar 2 effects the opening of the cash drawer, the issue of a receipt and entry upon the audit strip, upon which details covering the pay out of the money may be written. The amount is not entered into the totalizer and the device 11 remains inoperative.

The mechanism of the cash register is like that shown in the above-mentioned Randall and Geers patent, and insofar as necessary for the understanding of an embodiment of the present invention, and also the apparatus included in the ticket or stamp issuing device will now be described in detail. In FIG. 27 are illustrated diagrammatically the controlling circuit arrangements, and in the following description of the mechanisms where these are also diagrammatically shown in FIG. 27, a suitable cross reference will be made. This will enable a thorough understanding of the circuit arrangements when the operations thereof are referred to in the final part of this description.

As previously stated the keyboard of the cash register, FIG. 1, includes four denominational rows of amount keys 4, and a control row 3. A differential slide is associated with each row of keys and as this mechanism is similar for all of the rows of keys, with small differences in the case of the control row 3 which, however, are immaterial to the present invention, a general description will be given only of the mechanism associated with one of the rows in conjunction with FIG. 3.

Generally, the keys 20 are each depressibly supported in slots 21 and 22 in plates 23 and 24 and each key is retained against removal by means of a slot in its stem through which a rod 25 extends, each rod extending across the keyboard and through the corresponding and horizontally aligned keys in the other rows. The keys of each horizontal row are maintained in their upward positions by a coiled spring 26 engaging hooks in the keystems. The springs 26 lie on the upper surface of the plate 23, and when a key is depressed the spring is tensioned by being forced downwardly through the slot 21 and, when pressure is released from the key, the latter is elevated by the retraction of the spring.

Each vertical row of keys has a detent plate 27 for locking the keys one at a time in depressed position, and a control plate 28 for releasing a zero stop pawl, which is not shown as it does not concern the present invention, but which, on the depression of a key, is moved to release the differential mechanism to permit it to be moved during a machine operation. When a key is depressed a shoulder on its stem rides through the detent plate 27 which, under spring pressure, snaps back above the shoulder to lock the key down. It will be seen that if another key in the row is depressed, the detent plate will be moved to delatch from the shoulder of the previously depressed key which will immediately restore.

The differential mechanism associated with each row of keys includes a differential slide 29 supported for longitudinal movement in a framework comprising front and back members 30 and 31, secured respectively to inverted U-shaped bars 32 and 33 in turn secured to partition plates 34 for each row of keys, the plates in turn being carried on rods 35 and 36 extending between side plates of the keyboard assembly such as the one shown at 37. The differential slide 29 has eight projections upstanding therefrom, the odd numbered projections, which are adapted to cooperate with the stems of the odd numbered keys, having ears 38 bent towards the left, whereas the even numbered projections, which are adapted to cooperate with the even numbered keys, are provided with ears 39 bent towards the right, the bottoms of the keystems being staggered for this purpose. Depression of any one of the keys moves the stem thereof into the path of the corresponding ear 38 or 39. During a machine operation, the differential slide is moved towards the right until it is stopped by the appropriate ear engaging the stem of the depressed key, thus assuming a position corresponding to the value or significance of the depressed key. In the event of the "9" or uppermost key being depressed, the differential slide takes a full movement, and it is stopped in its fully moved position by a projection 40 thereon coming into contact with a square stud 41 in the left-hand partition plate 34, that is, considering that the left hand side of the machine is towards the front.

The differential slide 29 has a bifurcated arm 29' depending therefrom which engages a stud 42 projecting from a differential actuator 43 free on a rod 44 extending between the side frames of the machine, one of which is indicated at 45. Thus, when the differential slide 29 is moved to a set position during a machine operation by the differential actuator 43, the latter is permitted to rotate an equivalent amount.

During the first half cycle of each cycle of operation of the machine the actuator 43 is driven in a clockwise direction and subsequently, during the second half-cycle, is returned in a counter-clockwise direction.

Considering also the exploded diagrammatic representation shown in FIG. 4, the actuator 43 has therein a camming slot 46 which operates in cooperation with a camming slot 47 in a latch control plate 48, located immediately adjacent the actuator 43, and free on the rod 44. Immediately adjacent the latch control plate 48, and free on the rod 44, is a latch plate 49 (FIG. 4) which has pivoted thereon a latch 50 and also has pivotally connected thereto an indicator setting beam 51. The latch 50 normally engages a shoulder 52 in a driving segment 53 adjacent the latch plate 49 and free on the rod 44, and the latch 50 has a stud 54 projecting therefrom which passes through the camming slots 46 and 47 in the actuator and latch control plates, respectively. These two camming slots are disposed relatively to one another so as to exercise a scissor action on the stud 54 in the latch, and a spring 55, connected between the actuator 43 and the latch control plate 48, applies clockwise and counter-clockwise pressures, respectively, on these components so that, through the slots 46 and 47, an inward radial pressure is exerted on the stud 54 to maintain the latch 50 in engagement with the shoulder 52 of the driving segment 53.

The driving segment 53 has therein a slot 56 which is engaged by a stud 57 in a differential drive arm 58 free on a cross rod 59 (FIG. 3) supported between the side frames, such as 45, of the machine. An eccentric 60 adjustably connects the arm 58 to a companion arm 61, also free on the rod 59, the arm 61 being connected together with the similar arms of the other differential mechanisms by a rod 62 which is carried between a pair of differential cam levers such as 63, also free on the rod 59. The cam levers 63 each carry rollers 64 and 65 which cooperate, respectively, with the peripheries of companion cam plates 66 and 67 secured to a main driving shaft 68. The driving arm 58 carries a roller stud 69 which is adapted to cooperate with the beam 51 pivoted to the latch plate 49.

The indicator beam 51 has pivotally connected thereto one end of a link 70, the other end of which is coupled to one arm of a bell-crank 71 free on a shaft 72 supported between the side frames of the machine such as 45. The other arm of the bell-crank 71 is connected by a link 73 to a crank arm 74 secured on a shaft 75 journalled in sub-frames such as 76, for the indicator assembly which in turn are secured to the machine side-frames. Also secured on the shaft 75 is a crank 77 connected by a link 78 to a toothed indicator positioning segment 79 free on a rod 80 supported between the side frames of the machine. The segment 79 meshes with a pinion 81 free on a rod 82, supported between the machine side frames, the pinion being flexibly connected to a front indicator drum 83. The display faces of the drum 83 are visible through a window 84 in the front of the machine cabinet 85. Also secured on the shaft 75 is a similar set of components (not shown) for setting a back indicator which is visible through a back window 86.

An indicator locking and aligner pawl 89 carried on a shaft 90 engages with the pinion 81, and normally locks the pinion and thus the drum 83 in set position. During an operation of the machine, the pawl 89 is adapted to be disengaged at the beginning of the cycle, and re-engaged after the amount differentials and drums 83 have been reset in accordance with the new transaction.

The item and grand totalizers are of the interspersed type, that is, the wheels of similar denominational orders of the two totalizers are arranged side by side, and the totalizer line is shiftable to bring the wheels of the appropriate totalizer into alignment with the differential actuators 43 in dependence upon the type of operation to be performed. The manner in which the totalizer selection is carried out is not concerned in the present invention, and, therefore, only the relative location of the totalizer line is indicated, one of the totalizer wheels being indicated at 87 and the supporting shaft at 88. For a more detailed description of the totalizer line shifting mechanism, reference may be had to the above-mentioned Randall and Geers patent.

Figure 3:
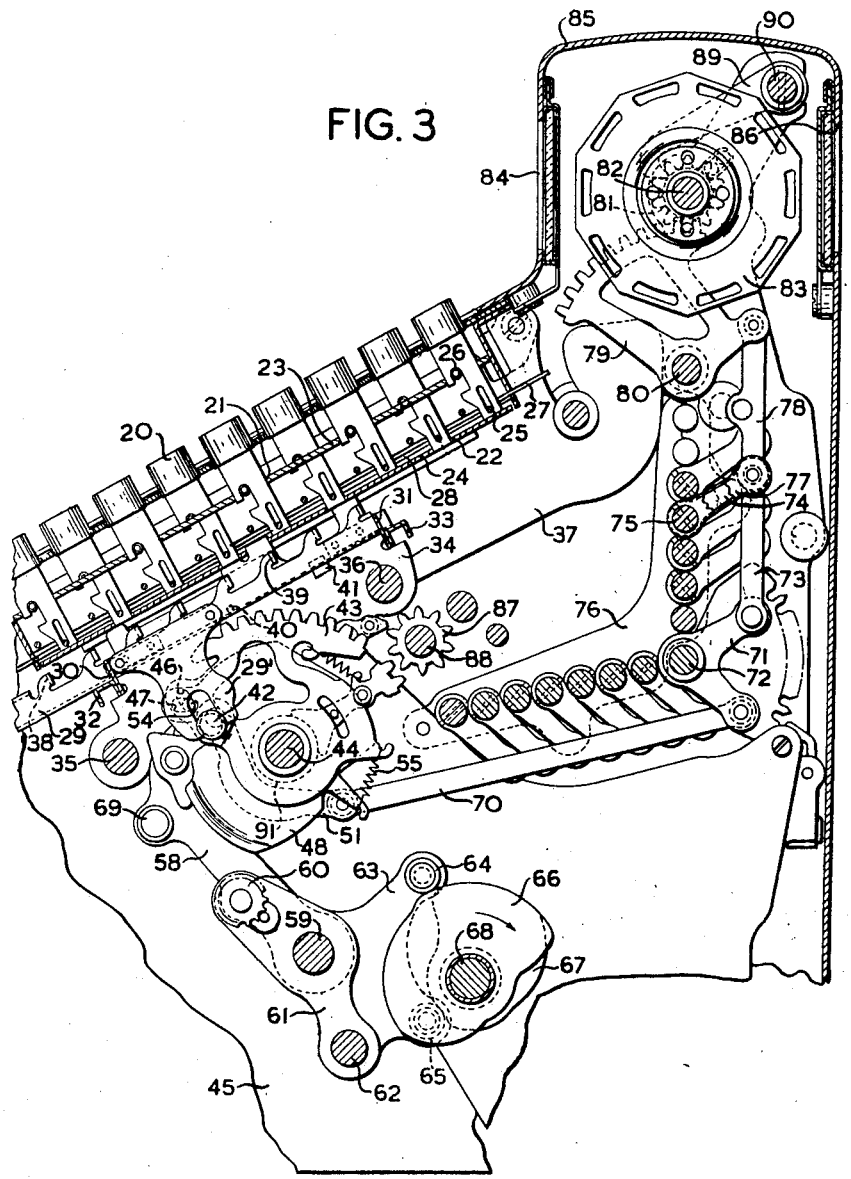
FIG. 3 is a cross sectional view of a cash register and shows the components thereof which are mainly concerned in the operation of the embodiment of the invention.

When the machine is at normal or home position, the differential slides 29 and the actuators 43 occupy the positions shown in FIG. 3, that is, one back from zero position which is for the purpose of enabling transfers to be effected, which, however, is not concerned herein.

During a machine operation, the driving shaft 68 makes one clockwise revolution. At the beginning of a machine operation the cams such as 66 and 67, through the connection shown, rock all of the arms 58 clockwise, which through the stud 57, FIG. 4, imparts a similar movement to the driving segment 53. The latter carries with it the latch 50 and thus the latch plate 49, and as the stud 54 is at this time clamped in the crutch formed between the cam slots 46 and 47, both the latch control plate 48 and the differential actuator 43 are also moved clockwise, the latter causing a rearward longitudinal movement of the differential slide 29, FIG. 3. There is a slight dwell in the movement when the slide 29 reaches zero position, for the purpose of effecting prepared transfers, but this is extraneous to the present invention and is, therefore, not described.

After the dwell the slide continues its rearward movement until one of its ears 38 or 39 encounters the stem of the depressed key whereupon its progress is stopped together with that of the actuator 43. However, the latch control plate 48 continues to be driven by the stud 54 whereby, through the slot 47 therein, an outward radial camming pressure is exerted on the stud which eventually disengages the latch 50 from the shoulder in the driving segment 53. Thus, the components 50, 49, 48 and 43, all cease to be driven and are brought to rest, whilst the driving arm 58 and the driving segment 53 will continue to be driven to complete the operating stroke.

On the rotation of the latch plate 49, dependent on the existing position of the indicator drum, the beam 51 may either immediately contact a bush 91 (FIG. 3) on the rod 44, or alternatively, be moved closer thereto. In the former case, the beam will be fulcrumed round the bush 91 to pull the link 70 towards the left to rotate the bell-crank 71 clockwise and impart a similar movement to cranks 74 and 77 and indicator positioning segment 79 through links 73 and 78. At this time the indicator locking pawl 89 has been disengaged from the pinion 81 so that the segment 79 imparts a counter-clockwise movement to the pinion and also the drum 83. The extent of movement of the beam 51 will depend on that permitted to the latch plate 49 and will impart sufficient movement to the drum 83 to cause it to change from the old to the new display. The rear indicator visible through the window 86 will similarly be set.

If the beam 51 is sufficiently distant from the bush 91 that it is not brought into contact with the bush during, and remains distant after, the setting of the latch plate 49, then during the continued movement of the driving arm 58, the roller stud 69 thereon will engage the rear of the beam and project it towards the bush causing the link 70 to be moved towards the right. This is in the reverse direction to that previously described, and, therefore, it will be appreciated that a clockwise movement is imparted to the indicator drum 83 to change from the old to the new display.

It will be appreciated that if the new indication is the same as the old indication, the setting of the latch plate 49 will cause the beam to come just into contact with the beam 91. After the setting of the indicator the locking pawls 89 are restored into engagement with the pinions 81, which remains so locked until a new transaction is entered into the machine.

On the return stroke of the driving arm 58, the driving segment 53 is also returned through the stud 57, and in due course a stud 92 (FIG. 4) in the segment will engage a nose 93 of the latch plate 49 causing this also to be rotated counter-clockwise carrying with it the latch 50. The latch, in its initial movement and through stud 54, will move the latch control plate 48 slightly counter-clockwise until the cam slots 47 and 46 are brought into the scissors position necessary to form the locking crutch for the stud 54 thereby to couple the differential actuator 43, in which movement the latch will move inwardly to re-engage the shoulder 52 of the driving segment. The whole assembly now returns to its normal or home position.

In regard to the components included in the cash register and involved in the electrical controlling circuitry for the ticket or stamp issuing device, these will now be described separately, the association later being made clear in a comprehensive description of the circuit operations in reference to FIG. 27.

Referring to FIGS. 3, 5 to 7 and 27. Each link 78 of the indicator setting linkages has associated therewith a tenpoint electrical switch. The construction of a preferred form of switch is shown in perspective and disassembled in FIG. 5. The body of the switch has the form of a longitudinal box 92 moulded from a thermosetting polymeric material, having one side completely open whereas one of the other sides 93 is cut away approximately to half its depth and has a long depression 94 therein. The body is provided with end lugs for the purposes of assembling and mounting. Between the two end walls of the body is mounted a rod 95 on which is slidably mounted a wiper assembly consisting of a sleeve 96 of metal or other suitable material having, projecting from one side thereof, a metal stud 97 on which is mounted a peripherally grooved washer 98 of a flexible synthetic plastic substance. The sleeve 96 carries a U-shaped wiper assembly having both limbs bifurcated to form two flexible wiper arms 99. The two wiper arms adjacent the base of the body cooperate with a metal feeder bar 100 which in some cases may constitute a complete metal strip with which both wiper arms cooperate, or, alternatively, of two divided metal strips one in respect of each wiper arm and which may be electrically connected separately or together as one. Metallic electrical connections from the feeder bar preferably extend to one or other or both of two metal blocks 101 secured exteriorly to the end walls of the body and which serve not only for establishing electrical connections but also for securing together the component parts of the switch.

The lid 102 of the body is of similar material to the body and has inset thereinto ten individual fixed contacts 103 arranged in two groups of five in staggered array, and the groups are spaced consistent with the wiper arms 99 of the wiper assembly. Wiring terminals, to which external wiring is connected, extend outwardly from the exterior surface of the lid, these terminals not being shown in FIG. 5, but being indicated at 104 in FIGS. 6 and 7. In FIG. 5 the lid is shown removed from the base and inverted, and it will therefore be seen that in assembling the lid is reversed and placed over the open side of the box and screwed in place by screws 105 which pass through lugs on the lid and the lugs on the base, and engage threads in the metal blocks 101. A wiring tab 101' is secured by one or both of the screws for connection to the feeder bar or bars 100. It will be appreciated that when the lid 102 is so secured, the groups of terminals will be aligned with the respective wiper arm 99 so that when the wiper assembly is moved it will individually bridge the contacts in the two groups seriatim and individually to the feeder bar or bars.

The switches are located in the machine so as to lie one in between adjacent links 78, and the wiper assembly of each switch is operatively secured to its respective link 78 by clipping the washer 98 through a hole in the link as illustrated in FIG. 6.

It is preferable that all of the switches are mounted as a sub-assembly which can be fitted to the rear, and secured between the main side frames, of the cash register. Such an assembly is illustrated in FIG. 7 which shows the switches mounted in a pressed mild steel frame 106 having right-angled end lugs by which it is secured to the main side frames of the cash register. The switches are secured to the framework by screws passing through the end lugs of each body 92, and in order to obtain a proper alignment a screw 107 is provided in the frame adjacent the lower end of each switch and terminates in an eccentric which engages in an aperture 108 in the body whereby an adjustment for vertical alignment of the switch can be made prior to tightening the fixing screw which passes with good tolerance through the hole in the lug of the body to allow such adjustment.

There is a switch provided in respect to each row of keys of the cash register, and in FIGS. 7 and 27, the switch associated with the control row 3 is designated CB, and the switches associated respectively with the denominational rows 4 of the amount bank keys are designated UC, TC, UD, TD and HD.

The spacing of the fixed contacts of the switches is such that from the bottom upwards, they represent the various digital positions of the differential mechanisms and linkages so that during an operation of the machine the switches will be set to contacts representative of the key depressed in the relevant row of the keyboard.

The cash register includes several cam operated electrical switches for controlling the operation of the circuit arrangements. The mechanical arrangements of these switches are shown in FIG. 8, whereas they are represented diagrammatically in FIG. 27 by symbols commonly used in schematic electrical circuitry, but similar references are employed.

The main driving shaft 68 of the cash register has secured thereon three electrical switch operating cams SC1, SC2 and SC3.

The cam SC1 has high and low surfaces each extending for 180°. An enclosed electrical micro-switch CS1 having normally open contacts and suitably secured to the frame of the machine, is related with the cam so that at about 180° in the machine cycle, the high surface of the cam operates upon the switch operating member to cause closure of the switch contacts, the switch remaining closed almost to the end of the machine cycle when the switch operating member rides from the high to the low surface of the cam to open the micro-switch.

The cam SC2 cooperates with the operating lever of an enclosed micro-switch CS2 having normally open contacts, the cam having low and high surfaces arranged so that the switch is operated from 60° through to 360° of the machine cycle.

The cam SC3 is adapted to operate on a cantilever contact spring set through the medium of a lever 109 pivoted at one end on a stud (not shown) secured conveniently in the framework of the machine.

The cam SC3 has a high surface extending about 30°, and an oppositely disposed low surface. The lever 109 cooperates with the cam through oppositely disposed roller studs 110 so that coincident with the high surface of the cam engaging one of the rollers, the other roller rides down on to the low surface, and vice versa. In the normal or home position fo the cam, the high surface thereof is located approximately 120° from the upper roller 110, and, therefore, when the cam is rotated clockwise in a machine operation, the upper roller is elevated by the cam to lift the free end of the lever 109. After elevation through 30° of rotation of the cam, the roller moves down onto the normal surface thereof until the high surface encounters the lower roller at about 300° which thereupon depresses the lower roller together with the free end of the lever from 300° to 330°.

The free end of the lever 109 has a bent over lug through which passes an operating pin 111 for the cantilever spring set, the lug and the operating pin being resiliently coupled together by reason of the lug being trapped between oppositely acting helical springs 112, 113 surrounding the pin and compressed between the lug and bushes 114 and 115, respectively, secured on the pin.

The cantilever spring set comprises five pairs of make contacts assembled in a pile mounted in and insulated from a channel shaped bracket 116 conveniently secured to the machine frame. The pairs of contacts are respectively designated CS3a to CS3e. The operating pin 11, FIG. 9, connects with an extension pin 117 which passes through apertures in all of the springs of the pile and by means of collets of insulating material is mechanically secured to the moving springs of the pairs of contacts, as represented by the thickened portions of the moving springs. That is, the pin 117 is mechanically connected to the lower springs of the pairs CS3d and CS3e and to the upper springs of pairs CS3a, CS3b and CS3c. Thus, it will be appreciated that when the free end of the lever 109 is elevated at about 120° of the machine cycle, the pin 117 elevates the lower springs of the pairs CS3d and CS3e into contact with their related upper springs, whereas when the lever 109 is lowered at about 300°, the pin 117 depresses the upper springs of the pairs CS3a, CS3b and CS3c into contact with their related lower springs.

The fixed springs of the pairs of contacts are held stationary at their ends within slots in an insulating partition 118 secured to the bracket 116.

The issue of stamps from the stamp issuing device 11, FIG. 1, as previously referred to, is made dependent on the position of the controls slide 5 and also upon the particular control key which has been depressed in the control row 3 of the keyboard. In other words, the issue of tickets or stamps from the device 11 only takes place when the control slide 5 is in its uppermost position which conditions the machine 1 to operate as a cash register, and thus such issue must be suppressed when the control slide occupies any other position.

Similarly, the ticket or stamp issuing device must be disabled when any one of the keys "PO," "REC A/C," "NET" and "CH" of row 3 is depressed, but enabled when any one of the keys "CR," "M%," "TOT*," "1*" and "ST" is depressed.

Referring to FIG. 10, the indicator setting link 70 associated with the control row 3 is pivotally connected to one limb of the bell-crank 71 free on the shaft 72, the other arm of the bell-crank being connected by link 73 to crank 74 secured on the shaft 75 which is linked to the relevant indicator drum in the manner previously described in connection with FIG. 3. Secured to the shaft 75 is a cam segment SC4 which cooperates with the operating member of a switch CS45, see also FIG. 27, suitably secured to the framework of the machine.

The cam segment SC4 will thus be set in dependence on the key which has been depressed in the row 3, and is provided with low and high surfaces arranged, respectively, to allow the switch to close or remain open according to whether the ticket or stamp issuing device is to be actuated or not in response to the depression of a particular key. For example, when the control slide 5 is in the "Register" position and when the segment SC4 is set to positions corresponding to the depression of keys "CR," "M%," "1*," "ST," then low surfaces are presented to the operating member of a switch CS45 to allow the switch to close, whereas when the segment is set to positions corresponding to keys "PO," "REC A/C,"

"NET" and "CH," then high surfaces are presented to the operating member of the switch to retain it open, which is also the case in the normal position to the segment.

The control slide 5 has a dependent portion 119 which is provided with slots loosely engaged by studs 120 in the side frame of the machine. The slide 5 at its rear end is coupled, through a pin and slot connection, to an arm 121 secured to one end of a shaft 122 supported in the frames such as 76, FIG. 3, and therefore it will be seen that a longitudinal movement of the slide 5 will cause a corresponding rotation of the shaft 122. This movement is actually employed in controlling the timing of the engagement of the totalizer, but as this controlling operation in itself in no way concerns the present invention, no further reference will be made thereto.

On the shaft 122 is a further cam segment SC5, see also FIG. 27, which cooperates with the switch CS45 and has a high surface corresponding to all positions of the slide with the exception of the "Register" position so that only in the latter position is the switch operating member allowed to descend to allow the switch contacts to close. Thus, with the slide 5 in any position other than the "Register" position, the switch CS45 will be prevented from closing irrespectively of any positioning of the segment SC4.

Within the cash register and conveniently secured to the base thereof is an electrical relay which is electromagnetically operated, mechanically locked in operated position, and electro-magnetically released. A typical example of such a relay is illustrated in FIG. 11, and also diagrammatically represented in FIG. 27, and will now be described.

A soft iron yoke piece 123 in the shape of a letter L laid in the horizontal, has secured thereto, and in magnetic contact therewith, the ends of the soft iron cores of two electromagnets, one an operating winding M(O) and the other a releasing winding H(R), the wires from the ends of the windings being connected to wiring terminals such as 124. The other ends of the cores of the electromagnets lie substantially vertically flush with the end of the horizontal limb of the yoke 123. Inverted L-shaped armatures 125 and 126 are provided for cooperation respectively with the electromagnets H(O) and H(R), and at their angles rest on knife edges provided at the end of the yoke, the dependent limbs of the armatures being normally spaced at a distance from the ends of the cores to allow clockwise pivoting of the armatures when the electromagnets are energized. The horizontal limb of the armature 125 cooperates with the outer moving spring of two pairs of cantilever break spring sets which are generally designated h as in the present usage they are connected in parallel. When the winding H(O) is energised the dependent limb of the armature 125 is attracted against the pressure of, and towards the open end of the core to elevate the upper springs of the spring sets out of contact with the lower springs thus breaking any circuit over the springs. The horizontal limb of the armature 126 is engaged by cantilever restoring springs 127 which apply tension to the armature to effect restoration thereof after operation. A cantilever latching spring 128, secured at its rear end to the yoke 123, has its free end bifurcated, the two tines 129 and 130 being bent re-entrantly with an upward inclination, the tine 129 being shorter than the tine 130.

The armature 125 has riveted thereto a latch finger 131 which overlies the tine 129, whereas the armature 126 has riveted thereto a delatching finger 132 which overlies the tine 130.

The operation of the relay is such that on the energisation of the operating electromagnet H(O) the dependent limb of the armature 125 is attracted to the core whereby the finger 131 rides along the tine 129 to effect depression thereof and eventually latches behind the end of the tine mechanically to lock the relay. The horizontal limb of the armature elevates the upper springs of the contacts h to cause them to break contact with the lower springs.

On the de-energisation of the winding H(O) the relay thus remains mechanically locked in its operated condition until the releasing winding H(R) is energised resulting in the attraction of its armature 126. In this movement the finger 132 rides along and depresses the tine 130 and thus the latching spring 128, but the tine is sufficiently long to prevent the over-riding of its end by the finger 132. The latching spring is depressed sufficiently to delatch the tine 129 from the finger 131 to permit the armature 125 to restore under the tension of the upper springs h which return into contact with the lower springs to re-establish the circuit points thereover. On the de-energisation of winding H(R), the armature 126 restores under the tension of the springs 127, so that the finger 132 releases the latching spring 128 which restores to normal to re-insert the tine 129 again into the path of finger 131.

In machine operations involving the issue of tickets or stamps, the operation of the device 11 (FIG. 1) cannot be commenced until after the differential mechanisms of the cash register have been set, that is, until after 180° of the machine cycle. Thus, in the majority of operations, the cycle of the cash register will be completed before that of the device 11, and, therefore, interlocking arrangements are provided whereby a further operation of the cash register cannot be commenced until the device 11 has completed its operating cycle.

These interlocking arrangements are illustrated in FIGS. 12, 13 and 14.

The motor bar 2, FIG. 12, is mounted on a plate 133, supported for vertical movement on three studs 134 secured in the right hand main side frame of the machine and engaging slots in the plate, a restoring spring 135 being stressed between a stud in the plate 133 and the right hand or rear upper stud 134 normally to maintain the plate and motor bar in upper position. The plate 133 has an inferior bent over ear 136, this ear normally being positioned in the path of a surface 137 at the upper end of a substantially L-shaped clutch control lever 138 mounted on a stud 139 fixed in the machine side frame, and having a counter-clockwise tension applied thereto by a spring 140 tensioned between the inferior end of the lever and a stud in the machine side frame thereby to maintain the surface 137 in contact with the ear 136 of the plate 133. The lever 138 has secured thereto a clutch control arm 141, the operating end of which cooperates with a shoulder 142 in a clutch pawl 143 free on a stud in a clutch disc 144 free on a stud 145 secured in the machine side frame. The clutch disc has a gear 147 secured thereto with which meshes a similar gear 148 secured to the main driving shaft 68 of the machine. The nose of the clutch pawl 143 is adapted to cooperate with a four-toothed ratchet 149 secured to a gear 150 both free on the stud 145. A spring 146 tensioned between the tail of the pawl 143 and a stud in the disc 144 exerts a clockwise pressure on the pawl tending to urge its nose into engagement with the ratchet 149, but this is normally prevented by the engagement of the clutch control arm 141 with the shoulder 142 of the pawl.

The gear 148 carries a roller 151 which is adapted to cooperate with a cam surface 152 of the clutch control arm 141. Meshing with the gear 150 is a pinion 153 secured to a shaft 154 of an electric driving motor 155, FIG. 14, secured to the base of the machine.

To the upper end of the clutch control lever 138, FIGS. 12 and 13, is pivotally connected a link 156 having its other end pivoted to an arm 157, FIG. 13, on a shaft 158 extending across the machine and supported between the main side frames thereof. To the other end of the shaft 158 is secured a further arm 159 having its free end connected, by a pin and slot connection, to a lever 160 having its lower end bifurcated to engage a stud 161 in a switch operating lever 162 pivoted on a stud 163 in the left-hand side frame of the machine. The switch operating lever 162 at its free end has a switch operating block 164 of insulating material secured therein which cooperates with a moving blade 165 of an electrical switch assembly, pivoted on, but insulated from, a stud 166. A spring 167 is tensioned between the switch blade 165 and a stud in the switch frame normally to urge the blade into contact with a cooperating fixed contact 168 secured to, but insulated from, the switch frame. The contacts of the switch are connected serially in the circuit of the supply mains and the motor 155.

A tail 169 of the moving switch blade 165 extends rearwardly, and above the switch is secured an electromagnet SL, see also FIG. 27, the latter having an armature 170 carrying a dependent finger 171 which is adapted to cooperate with the tail of the blade to effect locking thereof as will be explained in the following description of the operation of the arrangements.

When the motor bar 2, FIG. 12, is depressed, the plate 133 descends to remove the ear 136 from the surface 137 of the clutch control lever 138 to free the latter for counter-clockwise movement, about stud 139, under the action of spring 140.

The upper end of the control lever thus moves toward the left so that its upper hooked end moves above the ear 136 to lock down the motor bar 2, and also to carry with it the link 156, FIGS. 12 and 13, which rotates the arm 157, the shaft 158, and the arm 159 clockwise. The arm 159 through its pin and slot connection with lever 160 rotates the latter counter-clockwise which reversely rotates the switch operating lever 162. The insulating block 164, therefore, moves downwardly and is followed by the contact blade 165 under the urgency of spring 167 whereby the contact piece on the blade moves into contact with the contact piece of the fixed contact 168, as shown in FIG. 14, thereby to complete the series circuit for the driving motor 155 which, thus, commences to rotate to drive the pinion 153 clockwise, which reversely drives the gear 150 and the ratchet 149.

As at this time, the electromagnet SL is de-energised, its armature 170 will occupy the position as shown in FIG. 14, so that the tail 169 of the contact blade 165 is free to move upwardly in front of the finger 171.

Referring again to FIG. 12, when the clutch control lever 138 rotates counter-clockwise on depression of the motor bar 2, the clutch control arm 141 will move out of engagement with the shoulder 142 of the pawl 143 to remove restraint from the latter whereby it will rotate clockwise under the urgency of spring 146 to engage its nose with the ratchet 149 which is now being rotated by the driving motor. The nose of the pawl will be picked up by a tooth of the ratchet 149 so that the pawl, the clutch disc 144, and the gear 147 will all be rotated counter-clockwise to impart a reverse rotation to the gear 148 and the driving shaft 68, the latter driving the driving arms 58 of the differential mechanisms as previously described.

Just prior to the completion of the operating cycle, the stud 151 on the gear 148 engages the cam surface 152 of the clutch control arm 141 to cause the latter, and, therefore, the control lever 138 to be rotated clockwise back to normal position whereby the upper end of the control arm 141 is moved into the path of the shoulder 142 of the pawl 143. Thus, when the shoulder 142 re-engages the end of the control arm the pawl 143 is caused to be rotated clockwise to disengage from the ratchet 149.

Also on the clockwise rotation of the control arm 138, its hooked upper end is moved from above the ear 136 of the plate 133, permitting the latter and the motor bar to be restored upwardly under the urgency of spring 135, whereby the ear is re-inserted in front of the surface 137 to hold the clutch control lever in inoperative position. Also the linkage 156, 157, 158, 159, 160 and 162 is restored to return the switch blade 165 to its upward position to disconnect from the fixed contact 168 thereby to open the circuit of the driving motor.

In the entry of transactions involving the operation of the ticket or stamp issuing device 11 (FIG. 1), the operation of the latter is initiated at 180° of the operating cycle of the cash register. Immediately after this initiation occurs a circuit is closed for the electromagnet SL which will attempt to attract its armature 170, but, at this time, the blade 165 will be in its operated position, as shown in full in FIG. 14, so that its tail 169 is blocking the finger 171 to prevent any such movement of the armature. However, when the switch blade 165 is restored at the end of the operating cycle of the cash register, the tail 169 moves downwardly away from the finger 171 which thus allows the armature to move to its operated position, as shown in FIG. 13, and in broken lines in FIG. 14, whereby the finger moves above the tail 169. Thus if the motor bar is again depressed prior to the completion of the operating cycle of the ticket or stamp issuing device, whilst the linkage associated with the motor bar will be tripped, the closure of the starting switch for the driving motor positively will be prevented.

The electromagnet SL remains operated until the completion of the cycle of the ticket or stamp issuing device, and when it is eventually de-energised, the armature 170 restores to the position as shown in full lines in FIG. 14 to remove its finger 171 from blocking the blade 165 which is thus freed for further operation.

Reference will now be made to the ticket or stamp issuing device 11 (FIG. 1), the general construction thereof and details of the components included therein.

Referring to FIG. 15 which shows in perspective the general arrangement of the device. In this figure, the electrical components are given the same reference as their diagrammatic representation in the circuit diagram shown in FIG. 27.

The components of the device 11 are mounted in a boxlike framework consisting of two side-plates 172 secured vertically to a base plate not designated. The framework is divided longitudinally into two compartments by a partition 173. The rear compartment contains a transformer T for converting the comparatively high mains alternating current voltage to a suitable innocuous lower voltage, a full wave dry plate rectifying bridge R, a multibank multipoint switch SW, an alternating current driving motor SM, and a pack A–G of electromagnetic relays of the type employing cantilever springs. The front compartment contains the ticket or stamp feeding mechanisms and also individual carrier frames for the separate denominational rolls of tickets or stamps. Each of the latter consists of a division plate 174 having secured substantially centrally therein a rod 175 on which the core of the roll of tickets or stamps is positioned. The several plates 174 are pivotally supported at their upper rear corners on a cross-rod 176 extending between the side-plates 172 which also acts for spacing and bracing the side plates in collaboration with a similar rod 177.

The roll supporting frames, at this fronts, each have pivoted thereon a pressure roller assembly for pressing the leading end of the roll onto feeding sprockets as will later be described in connection with FIG. 23.

The drive from the driving motor SM is connectable through a reduction gear RG and a single cycle clutch mechanism, later described, to a gear wheel 178 which, on the one hand, meshes with a gear 179 secured to a shaft carrying the moving contacts or wipers of the switch SW, and on the other hand with a train of gears 180 connecting a driving shaft 181 for the ticket or stamp feeding mechanisms as will later be described.

In FIGS. 16 and 17 is illustrated the arrangement of the driving motor SM, the aforementioned clutch mechanism, and the multilever switch SW. The motor SM may be of any suitable fractional horsepower type and is carried on a chassis 182 securable by screws to two pillars secured in the left-hand side plate 172 as indicated in FIG. 16. To the open end of the shaft of the motor is secured a fan 183 for creating a forced air circulation in the rear compartment for cooling purposes. To the other end of the motor shaft is secured a small pinion indicated in FIG. 15 which meshes with a gear 184 free on a stud indicated by broken lines at 185, FIG. 16, secured at one end in the chassis 182 and passing into a clearance hole in the side plate 172. To the gear 184 is secured, through a bush 186, a ratchet wheel RW, FIG. 16, also free on the stud 185. Immediately adjacent the ratchet wheel RW is a clutch disc DC which is mounted on a bush free on the stud 185, the bush passing through the side-plate 172 and having the gear 178 (FIG. 15) secured to its other end. The clutch disc DC has pivoted thereon a pawl P which is urged by a spring 187 to engage its nose with the ratchet RW. The pawl has a shoulder formed near the end of its tail as will be seen, the tail also cooperating with a limiting stop 201 on the disc to limit counter-clockwise movement of the pawl. The clutch disc DC is provided with a stop block 188 thereon. The clutch disc DC also serves as a cam disc and has a cam recess 189 therein, and the periphery of the disc is engaged by a roller carried by the operating member of an electric make switch CS5, so that immediately the disc moves from its normal position the switch operating member is elevated to close the contacts of the switch.

Beneath the clutch disc DC, see also FIGS. 18 and 19, is located an electromagnet M1 comprising a winding around a soft iron core secured at one end to the dependent limb of an L-shaped yoke 190 secured in turn by a bracket, not shown, to the left-hand side plate 172.

An armature $m1$ of the electromagnet M1, through the medium of coaxial holes in bent over ears thereof, is freely pivoted on a pin 191 clamped to the yoke 190 by a clamping plate 192 of springy metal fixed by screws to the yoke. The plate 192 has a forwardly extending tongue 193 which extends through, and bears upon the upper bounding edge, of an aperture 194 through the top of the armature, which, as the armature is mounted so as to be at the right hand side of a dead centre plane, exerts a counter-clockwise pressure on the armature normally to maintain its lower end at a distance from the end of the core to form the operative air gap. The left-hand side of the armature, FIGS. 16 and 18, is conveniently extended upwards to form a finger 195, which, in the normal position of the armature engages the shoulder formed in the tail of the pawl P.

Also on the left-hand end of the pin 191 is freely pivoted an L-shaped stop arm 196 and a torsion spring 197 on the pin has its ends anchored to the armature and the stop arm, respectively, to exert a counter-clockwise pressure (FIG. 19) on the latter normally to maintain it against a limiting stop plate 198, riveted to the yoke 190, and also so that the end of the stop arm will be located in a path of the stop block 188 on the disc DC, FIG. 16. The armature has a pin 199, FIG. 19, therein which engages a cam slot 200 in the dependent limb of the stop arm 196.

Referring particularly to FIGS. 16, 18 and 19, the former, in particular, shows the relative positions of the components under normal conditions, that is, with the finger 195 engaging the shoulder in the tail of the pawl P to maintain the nose of the pawl out of engagement with the ratchet RW, and also with the end of the stop arm 196 in the path of the stop block 188. Thus, the disc DC is held immovable.

When the circuit for the motor SM is closed, and it starts to rotate, motion is imparted to the gear 184, FIG. 16, and the ratchet RW which idly rotates.

When the electromagnet M1 is energised the armature $m1$ will rotate clockwise, FIGS. 16 and 18, or counter-clockwise as shown in FIG. 19, about pin 191 whereby the finger 195 is moved from engagement with the shoulder in the tail of the pawl P which, under the urgency of spring 187, rotates clockwise to engage its nose with the ratchet RW. On the movement of the armature, which is counter-clockwise as shown in FIG. 19, the pin 199 in the armature will move along the cam slot 200 to cause the stop arm 195 to rotate clockwise, or counterclockwise as shown in FIGS. 16 and 18, thereby to remove its end from the path of the stop stud 188 in the disc DC. Thus, the disc DC and the train of gears 178 to 180 (FIG. 15) will be freed and will commence rotation.

When the electromagnet M1 is de-energised, the armature is released and the finger 195 is re-inserted into the path of the shoulder in the pawl P, and the stop arm 196 will be restored into position to re-engage the stop block 188 on the disc DC. Therefore, just before the completion of the cycle of rotation of the disc DC the shoulder of the pawl engages the finger 195 whereby the pawl is caused to rotate counter-clockwise, FIG. 16, to withdraw its nose from engagement with the ratchet RW. At the end of the cycle, which is reached under momentum after the disengagement of the pawl P from the ratchet RW, the disc DC is stopped by the tail of the pawl engaging the finger 195 and being pressed against the stop 201. Also the block 188 passes above the arm 196 so as to be reinserted in front of the nose thereof, the resilient coupling of the arm 196, through the spring 197, allowing the block to ratchet past the arm.

The switch SW, FIGS. 15, 17 and 27, is generally of the well known type commonly employed in telephone systems, and, in the present example, consists of five separate arcs or levels of contacts secured together to form a bank assembly, these arcs being designated $sw1$ to $sw5$ in FIG. 27, the arcs in this instance consisting of eleven separate contacts arranged radially and secured in insulating material. A spindle 202, mounted coaxially with the bank, carries an assembly of moving contacts or wipers, consisting of five electrically separate sets of wipers, such as 203, each set consisting of two pairs of flexible blades arranged at 180° apart so that as one pair enters the bank to make contact with the first contact of the respective arc, the other pair leaves the last contact in the arc. The contacts of each pair are tensioned towards each other so that their trailing tips bear on opposite sides of the contacts in the arc when in engagement therewith. Feeder brushes 204 extend from the bank to the inner disc like portions of the wipers for effecting electrical connection thereto.

The bank and wiper assembly are all supported on a plate 205 secured to the left-hand side plate 172, the bank being adjustably mounted on two studs 270 passing through slots in the bank assembly and which receive nuts 271 on their ends for clamping the bank assembly in an adjusted position.

Thus as will be seen, that when the motor SM is in operation, and the pawl P, FIG. 16, tripped to engage with the ratchet RW, the motion is imparted through the gears 178 and 179 to the spindle 202, whereby the wiper assembly is driven counter-clockwise, FIG. 17, so that the wipers will connect individually and consecutively with the contacts in their respective arcs.

A description of the mechanism for feeding the tickets or stamps from the ticket or stamp issuing device will now be described in connection with FIGS. 15, and 20 to 25.

As aforementioned an individual issuing mechanism is provided in respect of each denomination of tickets or stamps. Referring to FIGS. 15 and 20 the front portion of the framework is divided laterally into separate compartments by partitions 272 so as to segregate the feeding mechanisms. The driving shaft 181, to the left hand end of which is fixed one of the gears 180, FIG. 15, passes through all of the partitions and is finally supported in a bush in the right-hand side plate 172. Feeding sprockets are mounted on the shaft 181 within each compartment and are adapted to feed the respective strips 273 of tickets or stamps from the rolls such as 274, FIG. 20, mounted on the rod 175 in the plate 174, the latter plates being pivoted on the cross rod 176 so that the plates can be swung upwardly and clear of the framework for fitting or removing rolls.

The ticket and stamp issuing mechanisms are all identical so that it is necessary only to describe one thereof in detail.

Referring to FIG. 21, within each of the lateral compartments formed by partition 272 and mounted on the shaft 181 are, from left to right, a gear 275 fixed to the shaft, a gear 206 free on the shaft, a sprocket 207 free on the shaft and secured to the gear 206, a Geneva gear stop plate 208 fixed to the sprocket, and a pawl disc 209 (see FIG. 22) free on the shaft. The sprocket 207 has projecting from its right-hand side a series of equidistantly spaced studs 210 which act as stop teeth, and also driving teeth for driving a Geneva gear, and also along its middle circumference is provided with a series of equidistantly spaced feeding teeth 211 which are adapted to engage similarly spaced holes in the ticket or stamp strips 273 for feeding the latter from the machine. The stud teeth 210 in the sprocket, see also FIGS. 22 and 23, cooperate with a Geneva gear 212 pivoted on a pin 213 secured in convenient manner, which is not shown, to a bracket 214, see also FIG. 20, secured in turn to the left of the three segregating partitions 272. The Geneva gear 212 has fixed thereto a pinion 215 which meshes with a gear 216 fast on the driving pin of a cyclometer type counting meter 217 secured to the bracket 214. Thus, at each step of movement of the sprocket 207, the Geneva gear 212 is moved correspondingly to register a unit increment in the meter 217.

Beneath the sprocket assembly and secured to the left-hand partition 272 of the pair, is an electromagnetic designated M2-5, this designation being adopted in view of the nomenclature used in the circuit description later to be described. The electromagnet, FIGS. 20, 23 and 24, has an L-shaped yoke piece 218 to the end of the vertical limb of which is pivotally supported an armature 219, the mounting being similar to that described and illustrated in connection with FIG. 18 whereby a leaf spring tends to maintain the operative end of the armature at a distance from the core to form the operative air-gap.

The free-end of the armature has two similar lugs 220, see also FIG. 25, upstanding therefrom through which passes a rod 221 extending outwardly at each end. The left-hand end of rod 221, FIG. 25, engages in a slot in an arm 222 pivotally mounted on a rod 223 supported in ears 224, FIG. 20, at the rear of bracket 214. The free end of the arm 222 carries a pinion 225 which is adapted to bridge the two gears 275 and 206, see FIG. 21, but is normally maintained out of engagement with the gears by tension applied to the arm 222 by a spring 226 anchored between the arm and a pin 227, FIG. 20, secured in the left-side partition 272. The opposite end of the rod 221 engages in a cam slot in a stop pawl 228, pivoted on rod 223, and extends into an aperture in a back stop 229 pivoted at 230 on the stop pawl 228, the latter aperture being sufficiently large to permit the back stop a relative movement independently of the stop pawl 228. A spring 231 tensioned between the tail of the stop pawl 228 and the pin 227 maintains a counter-clockwise tension on the pawl to maintain its nose in engagement with a stud 210 of the sprocket 207 to stop any counter-clockwise feeding movement of the latter. The back stop has a counter-clockwise tension applied thereto by a spring 232, anchored between its tail and a hole through the bracket 214, to maintain the nose of the back stop behind a stud 210 to prevent reverse movement of the sprocket 207.

A shield 234, FIG. 23, secured on cross-rods 235 between the side plates 172, separates the ticket or stamp roll compartments from the ticket issuing mechanisms, the shield being bent over the sprockets 207 but having apertures therein through which the feeding teeth 211 of the sprockets project. The front end of the shield forms the bottom surface of the issuing apertures. The upper edges of the latter are formed by the guillotine tear-off plate 16 secured between brackets 266 fixed to the side plates 172.

The division plates 174, which carry the ticket or stamp rolls, each have, at their front ends, a stud 237 on which is pivoted a bent arm 238 carrying two split pressure rollers 239, one on each side of the pivot, which are adapted to bear on the outer peripheries of the sprocket 207 to maintain the ticket or stamp strip in contact therewith. In order to permit the rollers radial movement with respect to the sprocket, the pivot pins for the rollers engage in slots in the arm 238 and downward pressures are exerted on the pivots from the ends of a torsion spring 240 fitted on the stud 237. A further roller 241 at the rear extremity of the arm serves as a guide for the strip as it is removed from the roll.

The cabinet for the device comprises an immovable portion 242 enclosing the rear compartment, whilst the front top portion 13 is hinged to the back portion so that it can be pivoted upwardly and backwardly.

Simultaneously with the closure of the circuit for clutch electromagnet M1, FIG. 16, to connect the driving motor SM to the gears 178, 179, to drive the wipers of the switch SW, and 178, 180, to drive the shaft 181, the electromagnets such as M2-5, FIGS. 20, 23 and 24, associated with the issuing mechanisms required to effect the issue of tickets or stamps are also energized, and in consequence the armatures 219 thereof are caused to rotate counter-clockwise as viewed in FIGS. 20, 23 and 25 or clockwise as viewed in FIG. 24. In consequence, considering one mechanism, the rod 221 descends to cause the arm 222 to rotate clockwise (FIG. 25) and effect the coupling of the pinion 225 with the gears 275 and 206. The rod 221 also causes the clockwise rotation of the stop pawl 228 which withdraws its nose from engagement with the engaged tooth stud 210 of the sprocket 207. Also the back stop 229 is caused to make a clockwise movement to withdraw its nose from the path of the studs 210. Thus, as the driving shaft 181 and therefore, the gear 275 are being driven from the driving motor, the drive will be communicated over the pinion 225 to the gear 206 and the sprocket 207, the latter feeding the tickets or stamps 273, FIG. 20, from the device. The speed of the issue of the tickets or stamps is related to the stepping of the wipers of the switch SW, FIG. 15, so that one ticket or stamp is issued for each step from contact to contact of the wipers of the switch. When the appropriate number of tickets or stamps have been issued, the circuit for the electromagnet M2-5 is opened. Thus, the armature 219 is released, and rotates clockwise to elevate the rod 221 which causes the arm 222 to rotate counter-clockwise to decouple the pinion 225 from the gears 275 and 206 whereby the latter ceases to be driven, and also stop pawl 228 and the back stop 229 are rotated counter-clockwise to normal positions. An oncoming tooth stud 210 will therefore by-pass the back stop 229, against the pressure of spring 232, and will be arrested by the nose of the stop pawl 228. During the rotation of the sprocket 207, see FIGS. 22 and 23, the tooth studs 210 will cause rotation of the Geneva gear 212 by one step for each ticket of stamp issued, which movement is communicated through the pinion 215 to the gear 216 to advance the cyclometer counter 217 by one unit increments.

A back stop 233 (FIGS. 20 and 23) secured to the left-hand partition 272 is provided to arrest and support the pinion 225 in normal disengaged position.

The arrangements for effecting the issue of tickets or stamps under manual control will now be described with particular reference to FIGS. 15, 20, 22, 23 or 26.

A locking bar 244 passes freely through apertures in all of the partitions 272, FIG. 20, and, at its left hand end, has an aperture 245 therein, FIG. 26, which is engaged by a stem 267 eccentrically secured to the barrel of the barrel lock 19, FIGS. 15 and 20 secured to the left side frame 172, so that, normally when the lock is locked, the bar occupies a position to the left, whereas when the key is inserted and turned, the stem 267 rotates clockwise to move the bar 244 towards the right.

The finger press buttons 18, suitably mounted for sliding movement, one in respect of each ticket issuing mechanism, pass through clearance holes 246 in the bar 244 and each has a circumferential groove 247, FIGS. 22 and 23, adjacent the bar so that when the bar occupies the left or locking position the edges bounding the holes 246 in the bar engage within the circumferential grooves to lock the buttons against depression, whereas, when the bar is moved to the right to unlocking position, the holes are moved in concentricity with the buttons to allow the latter to be pressed therethrough.

To the inner end of each button 18 is pivotally connected a dependent portion of an arm 248 (FIGS. 22 and 23) freely mounted on a stud 249 in the right-hand partition 272 of the related pair of partitions. A spring 250 is stressed between a tail of the arm 248 and a stud in the right hand partition 272 which will tend to maintain the button 18 in its outward position, and the remote or rear end of the arm in downward position. A link 251 connects the latter end of the arm to the pawl disc 209, the disc having pivoted thereon a pawl 252 to which tension is applied by a spring 253, anchored between the tail of the pawl and a stud in the disc, to maintain the tail of the pawl in contact with a limiting stud 254 in the disc and also to cause the tip of the pawl to be elevated into the path of the tooth studs 210 of the sprocket 207. It is also to be noted that the pawl 252 will not interfere with the rotation of the sprocket under automatic actuation, as the nose of the pawl will be depressed as the studs move therepast.

On a stud 255 in the rear end of the arm 248 is mounted a pawl 256 to which, as shown in FIG. 22, a counter-clockwise tension is applied by a spring 257, anchored between the tail of the pawl and a stud in the arm, thereby to maintain the latter against a stop stud 268 in the arm.

On a stud 258 secured in the right-hand partition 272 is an arm 259 having a nose 260 which overlies the nose of the pawl 256. On a pivot stud 269 at the other end of the arm 259, is pivoted a slide 261 which terminates at its upper end in a tooth 262. The slide 261 has a slot therein engaged, for sliding movement, by a stud in the partition 272 to which one end of a helical spring 263 is secured, the other end of the spring being secured to the stud 269.

Thus the spring exerts a pressure on the arm 259 so as normally to maintain it in contact with a limiting stud 264 in the partition 272, and the slide 261 in upward position.

The tooth 262 in the slide 261 overlies and is adapted to engage a stud 265 in the end of the stop pawl 228, see also FIG. 25.

In the event of it being required to effect the issue of tickets under manual control, the barrel lock 19, FIGS. 15 and 20, is turned to move the slide 244 to unlocking position to permit depression of the butons 18 as already described.

The button 18 appertaining to the denomination of the ticket or stamp to be issued is depressed causing the rotation of the arm 248, that is, clockwise as viewed in FIG. 22 and counter-clockwise as viewed in FIG. 23. Thus, the pawl 256 rises and its nose engages the nose of the arm 259 to cause the latter to rotate whereby its rear end descends to carry with it the slide 261. This movement continues until the separation of the arcuate paths of the pawl 256 and nose 260 occurs whereupon the arm 259 and the slide 261 will snap back to normal upward position under the tension of spring 263. Thus the slide will make a rapid and limited excursion downwardly and back.

Referring particularly to FIGS. 23 and 25, on the descent of the slide 261 its tooth will engage the stud 265 at the end of the stop pawl 228 rotating this clockwise so that its nose first moves out of contact with the stud 210 of the sprocket 207 with which it has been engaging thus freeing the sprocket for movement. As the stop pawl 228 rotates it will of course depress the rod 221 to a certain extent, but it is important to note that although the movement of the stop pawl will be sufficient to clear the stud 210 of the sprocket, it will be insufficient to depress the rod to an extent to cause the necessary amount of rotation of the arm 222 to engage the pinion 225 with the gears 275 and 206.

The rotation of the arm 248 also causes the elevation of the link 251 which will rotate the pawl disc 209, that is, counter-clockwise as seen in FIG. 23, so that the pawl 252 will engage the next stud 210 of the sprocket similarly to rotate the latter by one step of movement. It is arranged that at the instant the pawl 252 engages the stud 210 the stop pawl 228 will just have cleared the previously engaged stud 210 to permit the rotation of the sprocket, and soon after the commencement of this movement, the pawl 256 releases the nose 260 to allow the arm 259 and slide 261 to return to upper position and thus release the stop pawl 228. However, as the sprocket has commenced movement the stud 210 previously engaged by the stop pawl 228 will at least have reached a position in front of, or may have first passed the nose of the pawl so that the latter cannot re-engage the stud, but will be prepared to engage the next succeeding stud after the completion of the step. The back stop pawl 229 will allow the studs 210 to ratchet thereby when the button 18 is depressed and, when pressure is released from the button 18, the arm 248, the link 251, the pawl disc 209 and the pawl 252 will be restored to normal under the tension of the spring 250, in which movement the pawl 252 will ratchet past the next stud 210.

Referring to FIGS. 20 and 26, associated with the bar 244, approximately midway therealong is a normally closed microswitch lock-out LOS secured to the adjacent partition 272. A portion of the bar is cut away, as indicated at 270, to form a depression in the upper surface of the bar to accommodate the lower portion of the switch, and the left-hand vertical edge bounding the depression cooperates with an operating stud 271 of the switch so that when the bar occupies the left-hand position in which automatic operation of the device will take place, the stud is free and the switch closed, whereas when the bar is moved to the right to condition the device for manual operation, the bar presses on the operating stud to cause the switch to open. The contacts of the switch are included serially in the electrical mains supply to the device from which it will be obvious that when the device is conditioned for manual operation, the switch will be opened so that the electrical supply will be disconnected from the device.

Referring to the controlling circuit arrangements illustrated in FIG. 27. In this figure, the apparatus included in the cash register, and that included in the ticket or stamp issuing device are shown separated by a broken line, the former being generally designated CR and the latter by SIM. The conductors of the cable 12 (FIG. 1) interconnecting the two items of apparatus are represented by the wiring between the two sections of the drawing and the break in the connections conveniently represents a multi-point plug and socket connection at the cash register. The figures in connection with which components have previously been referred to, where necessary, will be indicated in brackets following the reference.

In the drawing, the circuit illustrated includes a number of electro-magnetic relays of the standard type used in telephone systems in which the electro-magnet operates a knife-edge pivoted armature which, in turn, operates cantilever contact sets. For the sake of clarity, to indicate the several individual circuits, the circuit is shown drawn schematically on the detached contact principle, that is, in which the contacts of the relays are not shown associated with the electromagnets, but are divorced therefrom and included, as far as possible, in straight circuits between the operating potentials. For this purpose, the relays are designated by capital letters of the alphabet, and have therebeneath a numeral indicating the number of associated contacts. The contacts of the relays are designated by corresponding small case letters suffixed by qualifying numerals.

The ten-point electrical switches (FIGS. 5 and 7) associated with the indicator setting links are shown at the top of the drawing and are designated UC (units of cents), TC (tens of cents), UD (units of dollars), TD (tens of dollars) and HD (hundreds of dollars). The switch associated with the bank 3 of control key is designated CB.

The feeder bar (100) of switch UC is split into two halves, the lower half serving the contacts 0 to 4 and being connected to contact 0 of switch TC, whereas the upper half serves the contacts 5 to 9 and is connected in common with the feeder bars of all the other switches to the make contact of cam contacts CS1, the other contact of which is connected over a break contact of relay H to ground.

The contacts of the switch CB are connected variously to the cam contacts CS3a to CS3e, and thence to the operating or releasing windings H(O) or H(R) of relay H.

The motor lock-out electromagnet SL (FIGS. 13 and 14) is connected between the make contacts of contacts CS1 and a source of operating potential. The armature 170 of this electromagnet cooperates with the switch contacts 164 and 168 connected serially in the mains supply circuit to the electric driving motor of the cash register.

The cam contacts CS1 are controlled by the cam SC1 on the main driving shaft of the machine so that the contacts are closed between 180°–360° of the operating cycle of the machine.

The cam SC2 (FIG. 8) controls the contacts CS2 so that the contacts are closed between 60° to 360° of the operating cycle of the cash register.

The cam segments SC4 and SC5 (FIG. 10) jointly control the contacts CS45 so that the contacts can only be closed when the former has been set under one of the control keys in respect of which tickets or stamps are to be issued and also when the latter is set from the control slide only in "Register" position.

The contacts CS2 and CS45 are connected serially in the mains supply circuit to the device.

The cam SC3 (FIG. 8) controls the contacts CS3d and SC3e to close between 120° to approximately 150° of the operating cycle of the cash register, and contacts CS3a to CS3c between 300° and approximately 330° of the cycle.

The multibank switch (FIG. 17) included in the ticket or stamp issuing device SIM has five arcs of contacts sw1 to sw5 (FIG. 15), one in respect of each multipoint switch in the cash register.

The contacts 1 to 9 of switch TC are connected, respectively, to similarly numbered contacts of arc sw2, and the contacts of the latter are cross-connected to the contacts of arc sw1 with an ascending slip of one in the wiring that is, contacts 1–9 of sw2 are connected individually to contacts 2 to 10 of sw1. Contact 1 of sw1 is connected to the lower half of the feeder bar 100 of switch UC, and thus contact 0 of multipoint switch TC. Contact 0 of sw2, inter alia, is connected to contacts 0–4 of switch UC.

The contacts 0 to 9 of switches UD, TD, and HD are respectively connected to correspondingly numbered contacts of arcs sw3, sw4 and sw5.

The wipers of arcs sw1 and sw2 are connected, respectively, to front and back contacts of changeover contacts c2 of a relay C, the armature of the contacts being connected to a relay D and thence to a connection over which operating potential is applied. The wipers of the arcs sw3, sw4 and sw5 are connected, respectively, over relays E, F and G, to said operating potential connection.

The operating winding of relay C is connected between commoned contacts 5 to 9 of switch UC, and the connection to which operating potential is supplied.

The controlling electromagnets M2 to M5 (FIGS. 20 and 23) for effecting the engagement of the gearing for driving the ticket or stamp issuing mechanism, are connected, respectively, between the break contacts of change-over contacts of d1, e1, f1 and g1, of relays D, E, F, G, and the said connection over which operating potential is applied.

The electromagnet M1 (FIG. 16) for controlling the main clutch mechanism of the device, as described in connection with FIGS. 16 to 19, is connected in series with a parallel arrangement of contacts d2 to g2 of all of the relays D to G, so that the circuit for the electromagnet is opened when all of the relays become operated.

The power supply is indicated as being derived from an alternating current source and applied to the input leads S. One side of this supply is shown as being connected over the switch LOS (FIGS. 20 and 26) which, it will be remembered, is closed when automatic issue of tickets or stamps is to take place, and which is opened when issue is placed under manual control, and thence to one side of the primary winding of transformer T and to one side of the driving motor SM (FIG. 16). The other side of the supply S, on the one hand, is connected over cam contacts CS45 and CS2, to the other side of the primary winding of the transformer T, and also over make contacts a3 of a relay A to the other side of the driving motor SM, and on the other hand over contacts a4 of relay A to the said other side of the driving motor.

The secondary winding of transformer T is connected across the opposite diagonal points of a dry plate full wave rectifier bridge R (FIG. 15) the other diagonal points of the bridge being connected one to ground and the other to the operating potential supply lead over a fuse F.

The operation of the rectifier bridge R is well known, but, for completeness, a concise explanation is that, say, during the input half cycle when the upper terminal of the secondary winding of the transformer is positive, current flows through rectifier 1 to the fuse F, being blocked by rectifiers 3 and 4, and thence over the circuit elements to ground through rectifier 2 to the lower terminal of the secondary winding. When the lower terminal of the secondary winding is positive, current flows through rectifier 3, being blocked by rectifiers 2 and 1, over the circuit elements to ground and rectifier 4 to the upper terminal of the secondary winding. Thus current in the one direction always flows over fuse F to the operating potential supply lead, and will conveniently be referred to hereinafter as battery.

The main clutch for the ticket or stamp issuing device (FIG. 16) is designated MC the driven member DC of the clutch acting as a cam to control the contacts CS5 so that these contacts close in parallel to the contacts CS1 immediately after the device commences an operating cycle.

Considering the circuit operation, and in particular relation to a multiple item transaction in which tickets or stamps representing the value of the sale are to be issued.

In this case, the control slide 5 (FIG. 1) is in "Register" position and thus the cam segment SC5 will be positioned so as to present a low surface to contacts CS45. However, these contacts will not be allowed to close unless one of the keys in the row 3 of control keys controlling automatic ticket issue has been depressed, that is, either of the keys, ST, TOT*, 1* M%, or CR.

The amounts of the items of the transaction are entered separately merely by the depression of the appropriate amount keys followed by the motor bar 2 (FIG. 1).

In this case as none of the control keys in row 3 has been depressed the cam segment SC4 will occupy such a position that a high surface is presented to the contacts CS45 to retain them open and thus to disconnect the supply mains from the device.

Therefore, the amounts of the items of the transaction are accumulated in the itemizing totalizer. Assuming that there are no items of other categories to be entered, then, the total key TOT* (FIG. 2) is depressed followed by the motor bar 2 (FIG. 1). The latter as will be remembered from FIGS. 12 and 13, will cause the closure of switch contacts 164 and 168 to close the circuit for the driving motor of the cash register, thereby to insert the tail 169 of the moving contact blade 164 into the path of the armature 170 of the electromagnet SL.

In the ensuing cycle of the cash register, during the first half-cycle thereof, the itemizing totalizer is zeroised by the differential mechanisms which, therefore, together with the indicator setting mechanisms, assume a setting corresponding to the total of the amount standing in the totalizer. In the second half-cycle, the differential mechanisms are coupled to, and transfer the amount into, the grand totalizer, the indicator setting mechanisms remaining in the set positions, which will result in the switches UC to HD standing on contacts representing the amounts in the various denominations of the total.

As the total key TOT* in the control row 3 has been depressed, during the first half-cycle, the associated differential mechanism will assume a position such as to move the cam segment SC4 to present a low surface to the contacts CS45, and therefore, as the other segment SC5 is also presenting a low surface to the contacts, the latter will be allowed to close the mains supply S to the device.

At 180° of the cycle of the cash register, cam SC1 will cause closure of the contacts CS1 as a result of which the following circuit is completed, battery over relay A, contacts CS1 and $h1$ to ground return and relay A will operate. At contacts $a1'x'$ relay A prepares a locking circuit for itself. At contacts $a2$ the battery is connected to all of the components of the ticket or stamp issuing device. That is, battery will be applied to all of the electromagnets M2, M3, M4 and M5 over contacts $d1$, $e1$, $f1$, and $g1$ respectively, and thence to ground over contacts CS1 and $h1$. Therefore, all of the electromagnets energise to cause the pinions 225 (FIG. 25) to couple the gears 275, 206, for driving the feeding sprockets 207.

Also battery is connected over contacts $d2$ to $g2$ in parallel electromagnet M1, contacts CS1 and $h1$ to ground, and magnet M1 energises to trip the pawl P of the main clutch MC, and, thus, couple the drive from the motor SM through to the gear train 178, 180 (FIG. 15) through to the shaft 181 and thence over gears 275, 206 and pinions 225, to the feeding sprockets 207. Also the drive is connected over gear 179 to drive the wipers of switch SW.

At contacts $a4$ the motor SM is connected serially with the supply mains S over switch LOS, and contacts $a3$, in series with contacts CS2 and CS45, close a circuit in parallel with contacts $a4$, and the motor SM commences to rotate, and drive the sprockets 207, which thus commence to issue stamps, and also to drive the wipers of the switch SW, the issuing sprockets 207 feeding tickets or stamps one for each step of the wipers $sw$ from contact to contact. Also when the disc DC moves off normal, it closes contacts CS5 in parallel with CS1, so that a locking circuit for relay A is closed over contacts $a1'x'$. This ensures the continuance of the cycling of the device irrespectively of the previous completion of the cycle of the cash register when contacts CS1 will open.

Also on the closure of the contacts $a2$ battery is connected over electromagnet SL, contacts CS1, and $h1$ to ground, so that the electromagnet energises to attract its armature 170 which at this time encounters the tail 169 of the moving switch blade 164.

The wipers $sw1$ to $sw5$ continue to rotate until each one thereof encounters the contact to which the corresponding switch TC to HD has been set whereupon circuits are closed from battery over the respective relays D to G, the said wipers and arcs, switches TC to HD, contacts CS1, $h1$ to ground, and the relays will thus operate to open, at their contacts $d1$ to $g1$, the circuits of the associated electromagnets M2 to M5 to suspend the feed of the tickets or stamps, and also to close locking circuits for themselves.

When all of the relays have been operated the circuit for the clutch electromagnet M1 is opened at contacts $d2$ to $g2$ and the armature $m1$ is released into the path of the tail of the pawl P to effect disengagement of the latter from the ratchet wheel RW at the termination of the operating cycle of the device.

In the majority of cases the cash register will complete its operating cycle prior to the device SIM, and when this happens, the moving switch blade 164 will be restored to normal out of contact with the cooperating contact 168, and its tail 169 will move beneath the armature 170 whereby the latter will move into locking position above the said tail until the completion of the cycle of the device SIM, thus preventing further operation of the cash register until this latter event.

At the termination of the cycle of the device SIM the low surface of the disc DC is presented to the contacts CS5 whereby the latter open to remove ground from all of the relays which all release to restore their contacts, relay A also removing battery potential therefrom.

Therefore, in this case tickets or stamps representing in value the total amount of the sale are issued.

Referring to the switch CB, as the total key TOT* has been depressed, the wiper of the switch will be set to contact 6. Therefore, at 300° to 330° in the operating cycle of the cash register when contacts CS3$a$ to CS3$c$ are closed, by cam SC3, a battery will be connected over the feeder bar and contact 6 of switch CB, contacts CS3$c$ release winding H(R) of relay H to ground, thus energising this coil for a short period. In this case, this is merely to ensure that the relay H is released at the end of the cycle, and performs no other function at this time.

Referring to cam SC2 which is adapted to cause closure of its associated contacts CS2 between approximately 60° to 360° of the operating cycle of the cash register. The closure of the circuit to the primary of the transformer T will occur over contacts CS2, CS45, and immediately upon the setting of the cam segment SC4 prior to the completion of the first half cycle of operation of the cash register, and therefore, before the closure of cam contacts CS1 to initiate the operation of the device SIM. This is to ensure that the output from the rectifier R has reached a stable potential prior to the said initiation of the operation of the device SIM. At about 360° the contacts CS2 will be opened, but the circuit to the transformer T and rectifier R and motor SM will be maintained over contacts $a3$ until relay A is released at contacts CS5 at the completion of the operating cycle of the device SIM.

Assuming that after the entry of the items of a transaction in regard to which tickets or stamps are to be issued, the sub-total key ST (FIG. 2) is depressed. This causes the machine to execute a sub-total operation to sub-total or read the amount in the itemizing totalizer, that is, in the first half-cycle of the cash register operation the differential mechanisms zeroise the itemizing totalizer to set the indicator linkage and printing mechanisms accordingly, and in the second half-cycle, re-enter the total into the itemizer.

In this event, the operation of the device SIM is initiated to issue tickets or stamps in accordance with the total in the itemizing totalizer, at 180° of the cycle of the cash register.

However, at 300° of the latter cycle, that is, after the contacts CS5 have closed in parallel with contacts CS1, the cam SC3 closes contacts CS3$a$, CS3$b$, and CS3$c$, whereupon a circuit is closed from battery over feeder bar and contact 8 of switch CB, contacts CS3a, operating winding H(O) of relay H which, therefore, operates, and mechanically locks as previously described in connection with FIG. 11. Contacts h1 thus open to disconnect the ground from contacts CS1.

This enforces that a further controlling operation of the cash register be performed before the operation of the device SIM can again be initiated. If a total operation ensues, then at 300° to 330° of the cash register operating cycle, cam SC3 will close contacts CS3c to energise the releasing winding H(R) of relay H to bring about the release of the relay to reclose contacts h1 in preparation for an ensuing operation. In this connection, it will be remembered that cam SC2 at 360° will open contacts SC2 so that the reapplication of ground to contacts CS1 will coincide with the opening of contacts CS2 which will prevent any initiation of the operation of the device SIM.

Assuming that a sub-total operation, in respect of which tickets or stamps have been issued, is followed by the entry of one or more net items in respect of which such issue is not to take place. These latter items are entered under control of the NET key FIG. 2, and will be added to the sub-total already existing in the itemizing totalizer. At each entry of a net item, at 120° of the machine cycle, the cam SC3 will close contacts CS3e, thus completing a circuit from battery over the feeder bar and contact 4 of switch CB, the said contacts CS3e, operating winding H(O) of relay H to ground. This ensures that the relay H is operated or retained operated to prevent the operation of the device SIM. In addition, when the NET key is depressed the cam segment SC4 will present a high surface to contacts CS45 to retain them open.

Similarly, if a transaction consists entirely of net items, relay H will be operated and locked so that its contacts h1 will disconnect the ground from contacts CS1, and thus prevent the operation of the device SIM. The relay H will be released in the ensuing total operation as previously described.

In the event of a credit entry into the cash register, the key CR, FIG. 2, is depressed together with the relevant amount keys followed by the motor bar. The differential mechanism associated with the row of control keys 3 will set to its second position where the cam segment SC4 will present a low surface to contacts CS45 to permit their closure, and also the wiper of switch CB will be set onto contact 2. Thus the operation of the device SIM will take place to issue tickets or stamps corresponding to the value of the credit, and also at 330° of the cash register operating cycle, a circuit will be closed over cam contact CS3c for winding H(R) of relay H to ensure that the relay will be released in preparation for an ensuing entry.

If the received on account key "REC A/C," is depressed, then in the ensuing machine operation the cam segment SC4 is positioned to present a high surface to the contacts CS45 thus to prevent their closure and the operation of the device SIM so that no issue of tickets or stamps will take place.

In the event of the single item key 1* being depressed together with the relevant amount keys, followed by the motor bar, in the ensuing cycle of the cash register, the cam segment SC4 will be set to present a low surface to the contacts CS45, so that the device SIM will be operated to issue tickets or stamps equivalent to the amount, the switch CB being ineffective in this instance.

If the change key CH is depressed, the cam segment SC4 is again set to a position to present a high surface to the contacts CS2 so that they will be prevented from closing and thus the device SIM will remain inoperative.

Referring to the arrangements for effecting the double issue of stamps or tickets in respect of any transaction. The items of the transaction are entered and sub-totalled as previously described resulting in the issue of tickets or stamps equivalent to the amount involved. This as will be remembered will bring about the operation and locking of relay H.

Following the sub-total operation, the key M% is depressed followed by the motor bar. The key M% also causes the cash register to execute a sub-total operation. However, during this operation the differential mechanism associated with the row of control keys 3 will receive a setting such as to position the wiper of switch CB to contact 5. Therefore, at 120° of the cycle of the cash register a circuit will be completed from battery over the feeder bar and contact 5 of the switch CB, contacts CS3d, release winding H(R) of relay H to ground and relay H releases again to connect ground to contacts CS1. Therefore, at 180° of the machine cycle when contacts CS1 close, the device will be caused to issue stamps or tickets equivalent to the sub-total which will be a repetition of the previous issue. At 300° in the machine cycle, when cam SC3 closes contacts CS3b, a circuit will be closed over these contacts and contact 5 of switch CB to operating winding H(O) of relay H causing the relay again to operate and lock whereby its contacts h1 disconnect ground from contacts CS1.

When the device SIM is conditioned for the issue of tickets or stamps under manual control, and the bar 244, FIGS. 20 and 26, moved to the right, the normally closed switch LOS is caused to open which will open a point in the circuit from the supply S to the device, thus preventing any operation of the latter under electrical control.

In the arrangements illustrated, it is provided that no individual tickets or stamps are issued in respect of the lowest denominational order, but, instead, an additional ticket or stamp is issued in respect of the next highest order only if and when the value of the digit of the lowest order exceeds 4.

These arrangements will now be described. It will be seen that the contacts of switch UC associated with the lowest order are divided into two commoned groups 0 to 4 and 5 to 9, the feeder bar being divided into a portion for each group. The group 0 to 4 is connected to contact 0 of arc sw2 and thence over change-over contacts c2 to relay D. Contact 0 of switch TC is also connected to contact 1 of arc sw1. There is an ascending slip of one in the interconnecting wiring between the arc contacts 1 to 9 of sw2, and contacts 2 to 10 of arc sw1 so that the contacts of the former are connected to the next higher contacts of the latter. The group 9 to 5 of switch UC is connected to relay C.

Assuming, therefore, that the switch UC has been set to one of the contact 0–4 whereas no digit has to be entered into the next denomination so that the wiper of switch TC stands on contact 0. When cam contacts CS1 close at 180° ground is connected over the feeder bar and contact 0 of switch TC, lower half of the feeder bar and commoned contact 0–4 of switch UC, contacts c2 relay D, contacts a2 to battery and relay D operates to lock at contacts d1 and immediately to open the circuit for the electromagnet M2. This occurs so rapidly that the electromagnet M2 cannot energise so that the ticket or stamp issue will not take place.

If the switch TC has been moved off normal, then the connection from contact 0 thereof to the lower half of the feeder bar of switch UC will have been disconnected, and, therefore, tickets or stamps will be issued in accordance with the setting of switch TC.

If the switch UC is set to any one of the contacts 5 to 9, and assuming that switch TC is standing at normal, then immediately cam contacts CS1 close at 180°, a circuit is completed from ground over the latter contacts, upper half of the feeder bar and commoned contacts 5 to 9 of switch UC, relay C, contacts a2 to battery and relay C will operate and lock over contacts c1. At contacts c2, the connection to relay D is changed over from the wiper of arc sw2 to the wiper of arc sw1 and, therefore, as, at this time, the latter will be located on contact 0, a circuit for relay D will not immediately be closed, thus permitting electromagnet M2 to energise and couple the feeding mechanism for issuing tickets or stamps of the second denominational order. As it is assumed that switch TC is standing at normal, the ground from cam contacts CS1 will be extended over contact 0 of this switch, to contact 1 of arc $sw1$, and, therefore, immediately the switch SW has taken one step, at which time one ticket or stamp of the second denominational order will have been issued, the circuit for relay D is completed to open, at contacts $d1$, the circuit for the electromagnet M2 to suspend further issue of stamps.

Assuming that the switch UC has been set to one of the contacts 5 to 9 and the switch TC to any one of the contacts 1 to 9, then when cam contacts CS1 close, relay C is operated as before described, and ground is extended over the feeder bar and particular contact of switch TC to a contact in the arc $sw1$ which represents the next higher digit to that which switch TC has been set. This will result in the issue of an additional ticket or stamp in respect of the digit entered into the lowest denomination.

Obviously, relay C will be released at the end of the cycle of the device SIM when the contacts CS5 open.

While the form of mechanism shown and described herein is admirably adapted to fulfil the object primarily stated, it is to be understood that it is not intended to confine the invention to the one form or embodiment disclosed herein, for it is susceptible of embodiment in various other forms.

What I claim is:

1. The combination of a cash register, accounting or similar machine including a totalizer in the said machine, means to enter amounts of a transaction into said totalizer, switching means including a plurality of stationary contacts and a differentially settable means settable to engage the stationary contacts in accordance with the amount set up in said totalizer, and a ticket or stamp issuing device remotely situated from the said machine and having scanning means connected to the stationary contacts of said switching means for reading the amounts set therein, means under control of said scanning means for issuing tickets or stamps from said device, and means for driving simultaneously said scanning means and said issuing means whereby tickets or stamps will be issued representing the amount of the transaction entered in said totalizer.

2. The combination of a cash register, accounting or similar machine including a totalizer in the said machine, means to enter amounts of a transaction into said totalizer, switching means including a plurality of stationary contacts and a differentially settable means settable to engage the stationary contacts in accordance with the amount set up in said totalizer, scanning means connected to the stationary contacts of said switching means and including movable means for scanning the stationary contacts of the switching means and also including means to drive the movable means for reading the amount set in said switching means, and means controlled by the scanning means and operated by a differentially operable driving means for issuing tickets or stamps according to the amount set in the switching means.

3. The combination of a cash register, accounting or similar machine having a denominational keyboard for entering the amounts of transactions, and a remotely situated and controlled ticket or stamp issuing device for issuing tickets or stamps representing the values of the amounts involved in the transaction, the combination including a plurality of multipoint electrical switches in the said machine one for each denomination and which during the registration of a transaction are adapted respectively to be set up to contacts representative of the denominational values in the amount, a multiple bank electrical switch in the said device having a bank for each denomination including contacts corresponding, and individually connected, to those of the related denominational switch in the said machine, a plurality of feeding devices one for each denomination for feeding tickets or stamps, a driving means for driving the moving contacts of the multibank switch in unison, coupling devices for coupling the feeding devices individually to the driving means, and circuit arrangements whereby consequent on the entry of a transaction into the said machine, and the setting of the denominational switches, marking potentials are applied over the selected contacts to the associated contacts of the multiple bank switch and the driving means and coupling devices are operated to cause the operation of the feeding devices to feed the tickets or stamps, the moving contacts of the multibank switch also being driven by the driving means to seek said marked contacts in their respective banks and when found to cause the said coupling devices to be disengaged thereby to suspend the feeding of the respective tickets or stamps.

4. The combination of a cash register, accounting or similar machine having a denominational keyboard for entering the amounts of transactions, and a remotely situated and controlled ticket or stamp issuing device for issuing tickets or stamps representing the values of the amounts involved in the transaction, the combination including a plurality of multipoint electrical switches in the said machine, one for each denomination and which during the registration of a transaction are adapted respectively to set up contacts representative of the denominational values in the amount, a multiple bank electrical switch in the said device having a bank for each denomination including contacts corresponding and individually connected, to those of the related denominational switch in the said machine, a plurality of feeding devices, one for each denomination, for feeding tickets or stamps, a driving means for driving the moving contacts of the multibank switch in unison, coupling devices for coupling the feeding devices individually to the driving means, and circuit arrangements for rounding off values in a higher denomination according to the value in a lower denomination comprising a two-segment multipoint electrical switch for the lower denomination, one covering the contacts 0–4 while the other covers the contacts 5–9 and an element settable on either of said segments according to the lower order value, circuit means connected to the 5–9 segment and which includes electromagnetic means, second circuit means connected between the multiple bank electrical switches of the higher and lower denomination, said circuits connecting each contact of the higher order switch to the next highest contacts on the lower order switch, means for disabling said coupling devices when actuated, third circuit means connected between each of said multiple bank switch of the higher and lower order denomination and said disabling means, and switch means located in each of said third circuits and actuated upon energizing of said electromagnetic means to allow the lower order bank switch to actuate the disabling means whereby the feeding device of the higher order denomination will issue an additional stamp when the value of the lower order denomination is between 5 and 9.

5. The combination of a cash register, accounting or similar machine having a totalizer including means for entering amounts into the totalizer, switches in the said machine differentially settable by said means to represent said amounts, a ticket or stamp issuing device remotely situated from the said machine and having scanning means which are driven to sense the switches to read the amounts set up in the switches over electrical connections extending therebetween, a ticket or stamp feeding means which is driven differentially to feed different numbers of tickets or stamps simultaneously with the operation of said scanning means and controlled thereby to issue tickets or stamps representing a value equivalent to the amounts entered into the said totalizer, and means to drive the scanning means and said feeding means.

6. A cash register, accounting or like machine having an amount keyboard including a row of keys for each denomination of amounts to be entered, a differential member associated with each row of keys, and settable to a position in accordance with the value of the key depressed, a latent member associated with each differential member which receives a setting commensurate with that of the differential member and retains such setting until a succeeding machine operation, and an electrical differential switching means associated with each latent member adapted to establish any one of a plurality of electrical conditions in dependence upon said setting, and having in combination therewith a ticket or stamp issuing device remote from the said machine and including an electric sensing means connected over electrical connections to said differential switching means, ticket or stamp feeding means and driving means therefor, further electrical connections between the said machine and the ticket or stamp issuing device over which, after said latent member has been set, said driving means is caused to operate to drive the ticket issuing means to effect issue of stamps, said sensing means being caused to operate in unison with the issue of tickets or stamps and to cause stoppage of such issue when the sensing means senses the setting of the differential switch means.

7. A cash register, accounting or like machine including denominational amount entering means for entering amounts of transactions into the machine, differential means one associated with, and differentially settable in accordance with the amount entered into, each denomination of the amount entering means, a latent member associated with each differential means and adapted to be set correspondingly and to remain so set until readjusted in a succeeding machine operation, and a multicontact electric switch associated with each latent member so that its moving contact will be moved into contact with one of the fixed contacts corresponding to the setting of said member, and having in combination therewith a ticket or a stamp issuing device situated remotely from said machine and including a switching means comprising a plurality of multicontact banks one in respect of each and having its contacts connected to corresponding contacts of the multicontact electric switches in said machine, a driving means for the moving contacts of the switching means adapted to drive them in unison, an electromagnetic relay connected one to each moving contact of the switching device, and a ticket or stamp issuing device comprising a feeding means for each denomination of tickets or stamps to be issued, an electromagnetically operated clutch for each feeding means controlled by its respective electromagnetic relay and adapted to clutch the feeding means to the driving means, and circuit arrangements whereby after the settings of the differential and latent members during the entry of a transaction into the machine, selective marking potentials are applied over said multicontact electric switches to relevant contacts in the banks of the switching means and the moving contacts of the latter are caused to be driven by said driving means to search for said marked contacts and concurrently the said clutches are operated to connect the ticket feeding means to the driving means to issue tickets or stamps one in respect of each step of the moving contacts of the switching device from contact to contact until said latter moving contacts encounter contacts marked over the electric switches whereupon the respective relays are operated to cause disengagement of their associated clutches thereby to suspend the issue of the relevant tickets or stamps.

8. The combination according to claim 7 in which the said machine includes electrical contacts adapted to be operated by a cam on a shaft of the machine at an instant in the machine cycle after the said latent members have been set until the end of said cycle to apply one side of the operating potential to initiate the operation of the ticket or stamp issuing device.

9. The combination according to claim 7 in which the clutch member includes a pinion driven from said driving means, a pinion secured to the feeding means, an electromagnet, and a spur wheel bridging the two pinions and adapted to effect coupling thereof on the energization of the electromagnet.

10. The combination according to claim 7 in which the ticket or stamp issuing device includes a one cycle main clutch mechanism between the driving means and the ticket issuing means, an electromagnet controlling the engagement of the one cycle clutch mechanism, the circuit for the electromagnet including contacts of all the said relays in parallel whereby the circuit for the electromagnet is opened when all the relays become operated so that the clutch will automatically disengage at the end of the cycle.

11. The combination according to claim 9 in which the one cycle clutch mechanism includes a driving member driven from the driving means, a driven member, a coupling device on the driving member normally restrained from engagement with the driving member by the armature of the electromagnet but to effect said engagement on the energization of the electromagnet, the said armature being restored on the de-energization of the electromagnet into the path of the coupling member to effect its disengagement on the completion of the cycle of the driven member.

12. The combination according to claim 10 in which the ticket or stamp issuing device includes further cam operated contacts adapted to be closed in parallel with the cam contacts in the machine by a cam associated with the driving means and to remain closed until the end of the operating cycle of the ticket or stamp issuing device so that the latter will continue to operate to complete its cycle irrespectively of the prior opening of the contacts in the machine.

13. The combination according to claim 7 including means for recycling the ticket or stamp issuing device for obtaining a plural issue of tickets in respect of certain transactions.

References Cited in the file of this patent

UNITED STATES PATENTS

| | | |
|---|---|---|
| 1,172,195 | Carter et al. | Feb. 15, 1916 |
| 2,207,743 | Larson et al. | July 16, 1940 |
| 2,240,549 | Carroll | May 6, 1941 |
| 2,264,647 | Stearns | Dec. 2, 1941 |
| 2,366,890 | Wheeler | Jan. 9, 1945 |
| 2,497,784 | Mehan | Feb. 14, 1950 |
| 2,601,062 | Singer | June 17, 1952 |
| 2,728,521 | Benson et al. | Dec. 27, 1955 |
| 2,755,084 | Dodegge | July 17, 1956 |
| 2,767,981 | Hempel | Oct. 23, 1956 |
| 2,800,178 | Taylor | July 23, 1957 |
| 2,805,675 | Noyes | Sept. 10, 1957 |

UNITED STATES PATENT OFFICE
CERTIFICATE OF CORRECTION

Patent No. 3,006,538                                      Ocotber 31, 1961

Johann J. Deutsch

It is hereby certified that error appears in the above numbered patent requiring correction and that the said Letters Patent should read as corrected below.

Column 4, line 16, for "item" read -- items --; column 9, line 22, for "to" read -- of --; column 10, line 18, for "11" read -- 111 --; column 11, line 37, for "M(O)" read -- H(O) --; column 14, line 59, for "this" read -- their --; column 21, line 15, for "key" read -- keys --; column 22, line 12, strike out "of", first occurrence; column 26, line 49, for "contact" read -- contacts; column 28, line 30, after "corresponding" insert a comma.

Signed and sealed this 10th day of April 1962.

(SEAL)
Attest:

ERNEST W. SWIDER                                    DAVID L. LADD

Attesting Officer                                          Commissioner of Patents